(12) United States Patent
Kasada

(10) Patent No.: US 10,403,319 B2
(45) Date of Patent: *Sep. 3, 2019

(54) MAGNETIC TAPE HAVING CHARACTERIZED MAGNETIC LAYER, TAPE CARTRIDGE, AND RECORDING AND REPRODUCING DEVICE

(71) Applicant: FUJIFILM Corporation, Tokyo (JP)

(72) Inventor: Norihito Kasada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/380,309

(22) Filed: Dec. 15, 2016

(65) Prior Publication Data

US 2017/0178677 A1 Jun. 22, 2017

(30) Foreign Application Priority Data

Dec. 16, 2015 (JP) ................................ 2015-245142
Jan. 28, 2016 (JP) ................................ 2016-014401
Dec. 13, 2016 (JP) ................................ 2016-241073

(51) Int. Cl.
*G11B 5/70* (2006.01)
*G11B 5/78* (2006.01)
*G11B 5/708* (2006.01)

(52) U.S. Cl.
CPC .................. *G11B 5/78* (2013.01); *G11B 5/70* (2013.01); *G11B 5/7085* (2013.01)

(58) Field of Classification Search
None
See application file for complete search history.

(56) References Cited

U.S. PATENT DOCUMENTS

| | | | |
|---|---|---|---|
| 3,966,686 A | 6/1976 | Asakura et al. | |
| 4,112,187 A | 9/1978 | Asakura et al. | |
| 4,425,404 A | 1/1984 | Suzuki et al. | |
| 4,693,930 A | 9/1987 | Kuo et al. | |
| 4,746,569 A | 5/1988 | Takahashi et al. | |
| 4,825,317 A | 4/1989 | Rausch | |
| 5,242,752 A | 9/1993 | Isobe et al. | |
| 5,419,938 A | 5/1995 | Kagotani et al. | |
| 5,445,881 A | 9/1995 | Irie | |
| 5,474,814 A | 12/1995 | Komatsu et al. | |
| 5,496,607 A | 3/1996 | Inaba et al. | |
| 5,540,957 A | 7/1996 | Ueda et al. | |
| 5,585,032 A | 12/1996 | Nakata et al. | |
| 5,645,917 A | 7/1997 | Ejiri et al. | |
| 5,689,384 A | 11/1997 | Albrecht et al. | |
| 5,728,454 A * | 3/1998 | Inaba ....................... | G11B 5/70 427/128 |
| 5,786,074 A | 6/1998 | Soui | |
| 5,827,600 A | 10/1998 | Ejiri et al. | |
| 6,099,957 A * | 8/2000 | Yamamoto ......... | G11B 5/70678 428/323 |
| 6,183,606 B1 * | 2/2001 | Kuo ..................... | C23C 14/0688 204/192.15 |
| 6,207,252 B1 | 3/2001 | Shimomura | |
| 6,228,461 B1 | 5/2001 | Sueki et al. | |
| 6,254,964 B1 | 7/2001 | Saito et al. | |
| 6,261,647 B1 | 7/2001 | Komatsu et al. | |
| 6,268,043 B1 | 7/2001 | Koizumi et al. | |
| 6,496,328 B1 | 12/2002 | Dugas | |
| 6,579,826 B2 | 6/2003 | Furuya et al. | |
| 6,649,256 B1 | 11/2003 | Buczek et al. | |
| 6,686,022 B2 | 2/2004 | Takano et al. | |
| 6,770,359 B2 * | 8/2004 | Masaki ................... | G11B 5/70 428/336 |
| 6,791,803 B2 | 9/2004 | Saito et al. | |
| 6,835,461 B1 | 12/2004 | Yamagata et al. | |
| 6,921,592 B2 | 7/2005 | Tani et al. | |

(Continued)

FOREIGN PATENT DOCUMENTS

DE      101 46 429 A1    3/2002
GB       2495356 A       4/2013

(Continued)

OTHER PUBLICATIONS

JPO Abstract of JP 61-011924 A. (Year: 1986).*
Office Action dated May 4, 2018 which issued during the prosecution of U.S. Appl. No. 15/422,821.
Office Action dated May 4, 2018 which issued during the prosecution of U.S. Appl. No. 15/625,428.
Office Action dated May 4, 2018 which issued during the prosecution of U.S. Appl. No. 15/422,944.
Office Action dated May 7, 2018 which issued during the prosecution of U.S. Appl. No. 15/624,897.
Office Action dated May 7, 2018 which issued during the prosecution of U.S. Appl. No. 15/624,792.
Office Action dated May 7, 2018 which issued during the prosecution of U.S. Appl. No. 15/626,832.

(Continued)

*Primary Examiner* — Kevin M Bernatz
(74) *Attorney, Agent, or Firm* — Sughrue Mion, PLLC

(57) ABSTRACT

The magnetic tape includes a nonmagnetic layer containing nonmagnetic powder and binder on a nonmagnetic support, and a magnetic layer containing ferromagnetic powder, abrasive, and binder on the nonmagnetic layer, wherein a thickness of the nonmagnetic layer is less than or equal to 0.50 μm, a coefficient of friction as measured on a base portion of a surface of the magnetic layer is less than or equal to 0.35, and ΔSFD in a longitudinal direction of the magnetic tape as calculated with Equation 1, $\Delta SFD = SFD_{25°C} - SFD_{-190°C}$, is greater than or equal to 0.50, wherein, in Equation 1, $SFD_{25°C}$ denotes a SFD as measured in the longitudinal direction of the magnetic tape in an environment with a temperature of 25° C., and $SFD_{-190°C}$ denotes a SFD as measured in the longitudinal direction of the magnetic tape in an environment with a temperature of −190° C.

18 Claims, No Drawings

(56) References Cited

U.S. PATENT DOCUMENTS

| | | |
|---|---|---|
| 6,939,606 B2 | 9/2005 | Hashimoto et al. |
| 6,950,269 B1 | 9/2005 | Johnson |
| 7,014,927 B2 | 3/2006 | Sueki et al. |
| 7,029,726 B1 | 4/2006 | Chen et al. |
| 7,153,366 B1 | 12/2006 | Chen et al. |
| 7,255,908 B2 | 8/2007 | Ishikawa et al. |
| 7,511,907 B2 | 3/2009 | Dugas et al. |
| 7,515,383 B2 | 4/2009 | Saito et al. |
| 7,803,471 B1 | 9/2010 | Ota et al. |
| 7,839,599 B2 | 11/2010 | Bui et al. |
| 8,000,057 B2 | 8/2011 | Bui et al. |
| 8,524,108 B2 | 9/2013 | Hattori |
| 8,535,817 B2 * | 9/2013 | Imaoka .................. G11B 5/70 428/844 |
| 8,576,510 B2 | 11/2013 | Cherubini et al. |
| 8,681,451 B2 | 3/2014 | Harasawa et al. |
| 9,105,294 B2 | 8/2015 | Jensen et al. |
| 9,311,946 B2 | 4/2016 | Tanaka et al. |
| 9,495,985 B2 | 11/2016 | Biskeborn et al. |
| 9,530,444 B2 | 12/2016 | Kasada |
| 9,542,967 B2 | 1/2017 | Sekiguchi et al. |
| 9,564,161 B1 | 2/2017 | Cherubini et al. |
| 9,601,146 B2 * | 3/2017 | Kasada .................. G11B 5/78 |
| 9,704,425 B2 | 7/2017 | Zhang et al. |
| 9,704,525 B2 | 7/2017 | Kasada |
| 9,704,527 B2 | 7/2017 | Kasada |
| 9,711,174 B2 | 7/2017 | Kasada et al. |
| 9,721,605 B2 | 8/2017 | Oyanagi et al. |
| 9,721,606 B2 | 8/2017 | Kasada |
| 9,721,607 B2 | 8/2017 | Tada et al. |
| 9,748,026 B2 | 8/2017 | Shirata |
| 9,773,519 B2 * | 9/2017 | Kasada ................. G11B 5/5928 |
| 9,779,772 B1 * | 10/2017 | Kasada .................. G11B 5/712 |
| 9,837,116 B2 | 12/2017 | Ozawa et al. |
| 9,959,894 B2 | 5/2018 | Omura |
| 9,972,351 B1 | 5/2018 | Kaneko et al. |
| 9,978,414 B1 | 5/2018 | Kaneko et al. |
| 9,984,710 B2 | 5/2018 | Kasada |
| 9,984,712 B1 | 5/2018 | Ozawa |
| 9,984,716 B1 | 5/2018 | Kaneko et al. |
| 10,008,230 B1 | 6/2018 | Ozawa et al. |
| 10,026,430 B2 * | 7/2018 | Kasada .................. G11B 5/708 |
| 10,026,433 B2 * | 7/2018 | Kasada .................. G11B 5/78 |
| 10,026,434 B2 | 7/2018 | Oyanagi et al. |
| 10,026,435 B2 | 7/2018 | Kasada et al. |
| 10,062,403 B1 | 8/2018 | Kasada et al. |
| 10,074,393 B2 | 9/2018 | Kaneko et al. |
| 10,134,433 B2 | 11/2018 | Kasada et al. |
| 10,170,144 B2 | 1/2019 | Ozawa et al. |
| 2001/0038928 A1 | 11/2001 | Nakamigawa et al. |
| 2001/0053458 A1 | 12/2001 | Suzuki et al. |
| 2002/0072472 A1 | 7/2002 | Furuya et al. |
| 2002/0122339 A1 | 9/2002 | Takano et al. |
| 2003/0059649 A1 | 3/2003 | Saliba et al. |
| 2003/0091866 A1 | 5/2003 | Ejiri et al. |
| 2003/0124386 A1 * | 7/2003 | Masaki .................. G11B 5/70 428/842.8 |
| 2003/0170498 A1 | 9/2003 | Inoue |
| 2003/0228493 A1 | 12/2003 | Doushita et al. |
| 2004/0018388 A1 | 1/2004 | Kitamura et al. |
| 2004/0053074 A1 | 3/2004 | Jingu et al. |
| 2004/0197605 A1 | 10/2004 | Seki et al. |
| 2004/0213948 A1 | 10/2004 | Saito et al. |
| 2004/0218304 A1 | 11/2004 | Goker et al. |
| 2004/0265643 A1 | 12/2004 | Ejiri |
| 2005/0057838 A1 | 3/2005 | Ohtsu |
| 2005/0153170 A1 | 7/2005 | Inoue et al. |
| 2005/0196645 A1 | 9/2005 | Doi et al. |
| 2005/0260456 A1 | 11/2005 | Hanai et al. |
| 2005/0260459 A1 | 11/2005 | Hanai et al. |
| 2005/0264935 A1 | 12/2005 | Sueki et al. |
| 2006/0008681 A1 | 1/2006 | Hashimoto et al. |
| 2006/0035114 A1 | 2/2006 | Kuse et al. |
| 2006/0056095 A1 | 3/2006 | Saitou |
| 2006/0068232 A1 | 3/2006 | Mikamo et al. |
| 2006/0232883 A1 | 10/2006 | Biskeborn et al. |
| 2007/0009769 A1 | 1/2007 | Kanazawa |
| 2007/0020490 A1 | 1/2007 | Harasawa et al. |
| 2007/0224456 A1 | 9/2007 | Murao et al. |
| 2007/0230054 A1 | 10/2007 | Takeda et al. |
| 2007/0231606 A1 | 10/2007 | Hanai |
| 2008/0057351 A1 | 3/2008 | Meguro et al. |
| 2008/0144211 A1 | 6/2008 | Weber et al. |
| 2008/0152956 A1 | 6/2008 | Murayama et al. |
| 2008/0174897 A1 | 7/2008 | Bates et al. |
| 2008/0297950 A1 | 12/2008 | Noguchi et al. |
| 2008/0311308 A1 | 12/2008 | Lee et al. |
| 2009/0027812 A1 | 1/2009 | Noguchi et al. |
| 2009/0087689 A1 | 4/2009 | Doushita et al. |
| 2009/0161249 A1 | 6/2009 | Takayama et al. |
| 2009/0162701 A1 | 6/2009 | Jensen et al. |
| 2010/0000966 A1 | 1/2010 | Kamata et al. |
| 2010/0035086 A1 | 2/2010 | Inoue et al. |
| 2010/0035088 A1 | 2/2010 | Inoue |
| 2010/0053810 A1 | 3/2010 | Biskeborn et al. |
| 2010/0081011 A1 | 4/2010 | Nakamura |
| 2010/0134929 A1 | 6/2010 | Ito |
| 2010/0227201 A1 | 9/2010 | Sasaki et al. |
| 2010/0246073 A1 | 9/2010 | Katayama |
| 2011/0003241 A1 | 1/2011 | Kaneko et al. |
| 2011/0051280 A1 | 3/2011 | Karp et al. |
| 2011/0052908 A1 | 3/2011 | Imaoka |
| 2011/0077902 A1 | 3/2011 | Awezec et al. |
| 2011/0151281 A1 | 6/2011 | Inoue |
| 2011/0244272 A1 | 10/2011 | Suzuki et al. |
| 2012/0045664 A1 | 2/2012 | Tanaka et al. |
| 2012/0177951 A1 | 7/2012 | Yamazaki et al. |
| 2012/0183811 A1 | 7/2012 | Hattori et al. |
| 2012/0196156 A1 | 8/2012 | Suzuki |
| 2012/0243120 A1 | 9/2012 | Harasawa et al. |
| 2012/0244387 A1 | 9/2012 | Mori et al. |
| 2012/0251845 A1 * | 10/2012 | Wang .................. G11B 5/66 428/827 |
| 2013/0029183 A1 | 1/2013 | Omura et al. |
| 2013/0084470 A1 | 4/2013 | Hattori et al. |
| 2013/0088794 A1 | 4/2013 | Cherubini et al. |
| 2013/0256584 A1 | 10/2013 | Yamazaki et al. |
| 2013/0260179 A1 | 10/2013 | Kasada et al. |
| 2013/0279040 A1 | 10/2013 | Cideciyan et al. |
| 2013/0286510 A1 | 10/2013 | Rothermel et al. |
| 2014/0011055 A1 | 1/2014 | Suzuki et al. |
| 2014/0130067 A1 | 5/2014 | Madison et al. |
| 2014/0139944 A1 | 5/2014 | Johnson et al. |
| 2014/0272474 A1 | 9/2014 | Kasada |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2014/0374645 A1 | 12/2014 | Kikuchi et al. |
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0302879 A1 | 10/2015 | Holmberg et al. |
| 2015/0380036 A1 | 12/2015 | Kasada et al. |
| 2016/0061447 A1 | 3/2016 | Kobayashi |
| 2016/0064025 A1 | 3/2016 | Kurokawa et al. |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1 | 3/2017 | Ozawa et al. |
| 2017/0130156 A1 | 5/2017 | Kondo et al. |
| 2017/0178675 A1 | 6/2017 | Kasada |

(56) References Cited

U.S. PATENT DOCUMENTS

| | | |
|---|---|---|
| 2017/0178676 A1* | 6/2017 | Kasada .............. G11B 5/70626 |
| 2017/0186456 A1* | 6/2017 | Tada ....................... G11B 5/708 |
| 2017/0186460 A1 | 6/2017 | Kasada et al. |
| 2017/0221513 A1 | 8/2017 | Hiroi et al. |
| 2017/0221516 A1* | 8/2017 | Oyanagi ................. G11B 5/70 |
| 2017/0221517 A1 | 8/2017 | Ozawa et al. |
| 2017/0249963 A1* | 8/2017 | Oyanagi ................. G11B 5/71 |
| 2017/0249964 A1 | 8/2017 | Kasada et al. |
| 2017/0249965 A1 | 8/2017 | Kurokawa et al. |
| 2017/0249966 A1 | 8/2017 | Tachibana et al. |
| 2017/0287517 A1 | 10/2017 | Hosoya et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1 | 12/2017 | Kasada et al. |
| 2017/0372736 A1 | 12/2017 | Kaneko et al. |
| 2017/0372737 A1 | 12/2017 | Oyanagi et al. |
| 2017/0372738 A1 | 12/2017 | Kasada |
| 2017/0372739 A1 | 12/2017 | Ozawa et al. |
| 2017/0372740 A1 | 12/2017 | Ozawa et al. |
| 2017/0372741 A1 | 12/2017 | Kurokawa et al. |
| 2017/0372742 A1 | 12/2017 | Kaneko et al. |
| 2017/0372743 A1 | 12/2017 | Kasada et al. |
| 2017/0372744 A1 | 12/2017 | Ozawa et al. |
| 2018/0061446 A1 | 3/2018 | Kasada |
| 2018/0061447 A1 | 3/2018 | Kasada |
| 2018/0082066 A1 | 3/2018 | Tada et al. |
| 2018/0137887 A1 | 5/2018 | Sekiguchi et al. |
| 2018/0182417 A1* | 6/2018 | Kaneko .............. G11B 5/00826 |
| 2018/0182422 A1 | 6/2018 | Kawakami et al. |
| 2018/0182425 A1 | 6/2018 | Kasada et al. |
| 2018/0182426 A1 | 6/2018 | Ozawa et al. |
| 2018/0182427 A1 | 6/2018 | Kasada et al. |
| 2018/0182428 A1* | 6/2018 | Kasada ..................... G11B 5/78 |
| 2018/0182429 A1 | 6/2018 | Kasada et al. |
| 2018/0182430 A1 | 6/2018 | Ozawa et al. |
| 2018/0240475 A1 | 8/2018 | Kasada |
| 2018/0240476 A1 | 8/2018 | Kasada et al. |
| 2018/0240478 A1 | 8/2018 | Kasada et al. |
| 2018/0240479 A1* | 8/2018 | Kasada ................ G11B 5/3909 |
| 2018/0240481 A1 | 8/2018 | Kasada et al. |
| 2018/0240488 A1 | 8/2018 | Kasada |
| 2018/0240489 A1* | 8/2018 | Kasada ..................... G11B 5/70 |
| 2018/0240490 A1 | 8/2018 | Kurokawa et al. |
| 2018/0240491 A1 | 8/2018 | Ozawa et al. |
| 2018/0240492 A1 | 8/2018 | Kasada |
| 2018/0240493 A1* | 8/2018 | Tada ....................... G11B 5/712 |
| 2018/0240494 A1 | 8/2018 | Kurokawa et al. |
| 2018/0240495 A1 | 8/2018 | Kasada |
| 2018/0286439 A1 | 10/2018 | Ozawa et al. |
| 2018/0286442 A1 | 10/2018 | Ozawa et al. |
| 2018/0286443 A1 | 10/2018 | Ozawa et al. |
| 2018/0286444 A1* | 10/2018 | Kasada .............. G11B 5/70626 |
| 2018/0286446 A1 | 10/2018 | Ozawa et al. |
| 2018/0286447 A1 | 10/2018 | Ozawa et al. |
| 2018/0286448 A1* | 10/2018 | Ozawa ................... G11B 5/714 |
| 2018/0286449 A1 | 10/2018 | Kasada et al. |
| 2018/0286450 A1 | 10/2018 | Kasada et al. |
| 2018/0286451 A1* | 10/2018 | Ozawa ................... G11B 5/714 |
| 2018/0286452 A1 | 10/2018 | Ozawa et al. |
| 2018/0286453 A1 | 10/2018 | Kasada et al. |
| 2018/0301165 A1 | 10/2018 | Oyanagi et al. |
| 2018/0350398 A1 | 12/2018 | Kawakami et al. |
| 2018/0350400 A1 | 12/2018 | Kaneko et al. |
| 2018/0358042 A1 | 12/2018 | Kasada et al. |
| 2018/0374507 A1 | 12/2018 | Kasada |
| 2019/0027167 A1 | 1/2019 | Tada et al. |
| 2019/0027168 A1 | 1/2019 | Kasada et al. |
| 2019/0027171 A1 | 1/2019 | Kasada |
| 2019/0027172 A1 | 1/2019 | Kasada |
| 2019/0027174 A1 | 1/2019 | Tada et al. |
| 2019/0027175 A1 | 1/2019 | Kurokawa et al. |
| 2019/0027176 A1 | 1/2019 | Kurokawa et al. |
| 2019/0027177 A1 | 1/2019 | Kasada |
| 2019/0027178 A1 | 1/2019 | Kasada |
| 2019/0027179 A1 | 1/2019 | Ozawa et al. |
| 2019/0027180 A1 | 1/2019 | Kasada et al. |
| 2019/0027181 A1 | 1/2019 | Ozawa et al. |
| 2019/0035424 A1 | 1/2019 | Endo |
| 2019/0051325 A1* | 2/2019 | Kasada ..................... G11B 5/70 |
| 2019/0088278 A1 | 3/2019 | Kasada et al. |
| 2019/0096437 A1* | 3/2019 | Ozawa ..................... G11B 5/70 |
| 2019/0103130 A1* | 4/2019 | Kasada .............. G11B 5/00813 |
| 2019/0103131 A1 | 4/2019 | Kasada et al. |
| 2019/0103133 A1 | 4/2019 | Ozawa et al. |
| 2019/0103134 A1* | 4/2019 | Kasada ..................... G11B 5/72 |
| 2019/0103135 A1 | 4/2019 | Ozawa et al. |
| 2019/0130936 A1 | 5/2019 | Kaneko et al. |

FOREIGN PATENT DOCUMENTS

| | | | |
|---|---|---|---|
| JP | 61011924 A * | 1/1986 | ............. G11B 5/706 |
| JP | 61-139923 A | 6/1986 | |
| JP | 61-139932 A | 6/1986 | |
| JP | 63-129519 A | 6/1988 | |
| JP | 63-249932 A | 10/1988 | |
| JP | 64-57422 A | 3/1989 | |
| JP | 64-060819 A | 3/1989 | |
| JP | 5-258283 A | 10/1993 | |
| JP | 5-298653 A | 11/1993 | |
| JP | 7-57242 A | 3/1995 | |
| JP | 11-110743 A | 4/1999 | |
| JP | 11-175949 A | 7/1999 | |
| JP | 11-273051 A | 10/1999 | |
| JP | 2000-251240 A | 9/2000 | |
| JP | 2002-157726 A | 5/2002 | |
| JP | 2002-329605 A | 11/2002 | |
| JP | 2002-367142 A | 12/2002 | |
| JP | 2002-367318 A | 12/2002 | |
| JP | 2003-77116 A | 3/2003 | |
| JP | 2003-323710 A | 11/2003 | |
| JP | 2004-005820 A | 1/2004 | |
| JP | 2004-133997 A | 4/2004 | |
| JP | 2004-185676 A | 7/2004 | |
| JP | 2005-038579 A | 2/2005 | |
| JP | 2005-243063 A | 9/2005 | |
| JP | 2005-243162 A | 9/2005 | |
| JP | 2006-92672 A | 4/2006 | |
| JP | 2006-286114 A | 10/2006 | |
| JP | 2007-273039 A | 10/2007 | |
| JP | 2007-287310 A | 11/2007 | |
| JP | 2007-297427 A | 11/2007 | |
| JP | 2008-243317 A | 10/2008 | |
| JP | 2009-283082 A | 12/2009 | |
| JP | 2010-049731 A | 3/2010 | |
| JP | 2011-048878 A | 3/2011 | |
| JP | 2011-138566 A | 7/2011 | |
| JP | 2011-210288 A | 10/2011 | |
| JP | 2011-225417 A | 11/2011 | |
| JP | 2012-38367 A | 2/2012 | |
| JP | 2012-043495 A | 3/2012 | |
| JP | 2012-203955 A | 10/2012 | |
| JP | 2013-25853 A | 2/2013 | |
| JP | 2013-77360 A | 4/2013 | |
| JP | 2013-164689 A | 8/2013 | |
| JP | 2014-15453 A | 1/2014 | |
| JP | 2014-179149 A | 9/2014 | |
| JP | 2015-39801 A | 3/2015 | |
| JP | 2015-111484 A | 6/2015 | |
| JP | 2016-15183 A | 1/2016 | |
| JP | 2016-051493 A | 4/2016 | |
| JP | 2016-71926 A | 5/2016 | |
| JP | 2016-139451 A | 8/2016 | |

OTHER PUBLICATIONS

Notice of Allowance dated Aug. 30, 2017 which issued during the prosecution of U.S. Appl. No. 15/466,143.

Notice of Allowance dated Apr. 27, 2017 which issued during the prosecution of U.S. Appl. No. 15/052,115.

Notice of Allowance dated Jun. 2, 2017 which issued during the prosecution of U.S. Appl. No. 15/218,190.

Office Action dated May 2, 2018 which issued during the prosecution of U.S. Appl. No. 15/280,195.

(56) References Cited

OTHER PUBLICATIONS

Notice of Allowance dated May 8, 2017 from the US Patent & Trademark Office in co-pending U.S. Appl. No. 14/757,555.
Office Action dated Dec. 6, 2016 in co-pending U.S. Appl. No. 14/757,555.
Notice of Allowance dated May 8, 2017 from the US Patent & Trademark Office in co-pending U.S. Appl. No. 14/978,834.
Office Action dated Dec. 5, 2016 in co-pending U.S. Appl. No. 14/978,834.
Notice of Allowance dated Aug. 28, 2018 from the US Patent & Trademark Office in co-pending U.S. Appl. No. 15/422,821.
Notice of Allowance dated Sep. 4, 2018 from the US Patent & Trademark Office in co-pending U.S. Appl. No. 15/625,428.
Office Action dated Aug. 3, 2018 which issued during the prosecution of U.S. Appl. No. 15/380,336.
Office Action dated Aug. 23, 2018 which issued during the prosecution of U.S. Appl. No. 15/614,876.
Office Action dated Aug. 24, 2018 which issued during the prosecution of U.S. Appl. No. 15/620,916.
Office Action dated Aug. 23, 2018 which issued during the prosecution of U.S. Appl. No. 15/621,464.
Office Action dated Aug. 23, 2018 which issued during the prosecution of U.S. Appl. No. 15/626,720.
Office Action dated Jul. 6, 2018, which issued during the prosecution of U.S. Appl. No. 15/848,173.
Office Action dated Oct. 3, 2018 from the United States Patent and Trademark Office in U.S. Appl. No. 15/280,195.
Office Action dated Oct. 15, 2018, which issued during the prosecution of U.S. Appl. No. 15/619,012.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,897.
Notice of Allowance dated Oct. 11, 2018, which issued during the prosecution of U.S. Appl. No. 15/624,792.
Notice of Allowance dated Oct. 12, 2018, which issued during the prosecution of U.S. Appl. No. 15/626,832.
Notice of Allowance dated Oct. 11, 2018, which issued during the prosecution of U.S. Appl. No. 15/380,336.
Office Action dated Oct. 9, 2018, which issued during the prosecution of U.S. Appl. No. 15/628,814.
Office Action dated Oct. 22, 2018 which issued during the prosecution of U.S. Appl. No. 15/854,439.
Office Action dated Sep. 24, 2018 which issued during the prosecution of U.S. Appl. No. 15/690,400.
Office Action dated Sep. 27, 2018 which issued during the prosecution of U.S. Appl. No. 15/690,906.
Office Action dated Oct. 12, 2018 which issued during the prosecution of U.S. Appl. No. 15/626,355.
Office Action dated Oct. 12, 2018 which issued during the prosecution of U.S. Appl. No. 15/627,696.
Office Action dated Sep. 27, 2018 which issued during the prosecution of U.S. Appl. No. 15/854,383.
Office Action dated Aug. 10, 2017, which issued during the prosecution of U.S. Appl. No. 14/870,618.
Notice of Allowance dated Feb. 14, 2018, which issued during the prosecution of U.S. Appl. No. 14/870,618.
Office Action dated Sep. 26, 2017 issued by the Japanese Patent Office in JP Appln. No. 2014-265723 corresponding to U.S. Appl. No. 14/870,618.
Office Action dated Sep. 26, 2017 issued by the Japanese Patent Office in JP Appln. No. 2015-249264 corresponding to U.S. Appl. No. 14/870,618.
Office Action dated Nov. 16, 2016 which issued during the prosecution of U.S. Appl. No. 15/072,550.
Notice of Allowance dated Apr. 25, 2017 which issued during the prosecution of U.S. Appl. No. 15/072,550.
Notice of Allowance dated May 10, 2018 which issued during the prosecution of U.S. Appl. No. 15/615,871.
Notice of Allowance dated Mar. 16, 2018 which issued during the prosecution of U.S. Appl. No. 15/854,410.
Notice of Allowance dated Dec. 2, 2016, issued by the U.S. Patent and Trademark Office in U.S. Appl. No. 14/753,227.
Communication dated Nov. 18, 2016 from U.S. Patent & Trademark Office in U.S. Appl. No. 14/753,227.
Final Office Action dated Aug. 15, 2016 from U.S. Patent & Trademark Office in U.S. Appl. No. 14/753,227.
Office Action dated Feb. 4, 2016 from U.S. Patent & Trademark Office in U.S. Appl. No. 14/753,227.
Notice of Allowance, dated Jul. 12, 2017, issued by the U.S. Patent and Trademark Office in U.S. Appl. No. 15/388,864.
Communication dated Jun. 9, 2017 from U.S. Patent & Trademark Office in U.S. Appl. No. 15/388,864.
Office Action dated Apr. 26, 2017 from U.S. Patent & Trademark Office in U.S. Appl. No. 15/388,864.
Office Action dated Aug. 3, 2018 from U.S. Patent & Trademark Office in U.S. Appl. No. 15/388,911.
Office Action dated May 30, 2018 from U.S. Patent & Trademark Office in U.S. Appl. No. 15/388,911.
U.S. Appl. 15/052,115, U.S. Pat. No. 9,704,527.
U.S. Appl. No. 15/625,428, Allowed Dec. 4, 2018.
U.S. Appl. No. 15/378,907, U.S. Pat. No. 9,984,710.
U.S. Appl. No. 15/241,631, U.S. Pat. No. 10,026,435.
U.S. Appl. No. 14/209,065, U.S. Pat. No. 9,530,444.
U.S. Appl. No. 15/854,474, U.S. Pat. No. 9,978,414.
U.S. Appl. No. 15/854,403, Pending.
U.S. Appl. No. 15/241,297, U.S. Pat. No. 10,026,434.
U.S. Appl. No. 15/241,286, U.S. Pat. No. 10,026,433.
U.S. Appl. No. 15/464,991, U.S. Pat. No. 9,779,772.
U.S. Appl. No. 14/867,752, U.S. Pat. No. 10,026,430.
U.S. Appl. No. 15/854,438, Allowed, Issue Fee not yet paid.
U.S. Appl. No. 15/854,409, Pending.
U.S. Appl. No. 15/443,026, Pending.
U.S. Appl. No. 15/920,782, U.S. Pat. No. 10,134,433.
U.S. Appl. No. 15/920,563, Petition to Withdraw from Issue and RCE filed Dec. 17, 2018.
U.S. Appl. No. 15/920,533, Pending.
U.S. Appl. No. 15/900,144, Pending.
U.S. Appl. No. 15/900,080, Pending.
U.S. Appl. No. 15/900,230, Pending.
U.S. Appl. No. 15/900,164, Pending.
Office Action dated Oct. 5, 2017, which issued during the prosecution of U.S. Appl. No. 15/241,286.
Notice of Allowance dated Mar. 21, 2018, which issued during the prosecution of U.S. Appl. No. 15/241,286.
Office Action dated Oct. 5, 2017, which issued during the prosecution of U.S. Appl. No. 15/241,297.
Office Action dated Oct. 5, 2017, which issued during the prosecution of U.S. Appl. No. 15/241,631.
Office Action dated Oct. 5, 2017, which issued during the prosecution of U.S. Appl. No. 15/378,907.
Notice of Allowance dated Mar. 19, 2018, which issued during the prosecution of U.S. Appl. No. 15/378,907.
Notice of Allowance dated Mar. 27, 2018, which issued during the prosecution of U.S. Appl. No. 15/241,631.
Office Action dated Jan. 27, 2015 from the Japanese Patent Office in Japanese Application No. 2013-053543.
Notice of Allowance dated Mar. 14, 2018, which issued during the prosecution of U.S. Appl. No. 15/854,474.
Office Action dated Sep. 19, 2014, which issued during the prosecution of U.S. Appl. No. 14/209,065.
Office Action dated Mar. 13, 2015, which issued during the prosecution of U.S. Appl. No. 14/209,065.
Office Action dated Jul. 6, 2015, which issued during the prosecution of U.S. Appl. No. 14/209,065.
Office Action dated Sep. 10, 2015, which issued during the prosecution of U.S. Appl. No. 14/209,065.
Office Action dated Mar. 24, 2016, which issued during the prosecution of U.S. Appl. No. 14/209,065.
Notice of Allowance dated Oct. 6, 2016, which issued during the prosecution of U.S. Appl. No. 14/209,065.

(56) References Cited

OTHER PUBLICATIONS

Notice of Allowance dated Mar. 21, 2018, which issued during the prosecution of U.S. Appl. No. 15/241,297.
Notice of Allowance dated Jun. 28, 2017, which issued during the prosecution of U.S. Appl. No. 15/464,991.
Office Action dated Nov. 8, 2016 from the Japanese Patent Office in Japanese Application No. 2014-199022.
Office Action dated Feb. 25, 2016, which issued during the prosecution of U.S. Appl. No. 14/867,752.
Office Action dated Oct. 19, 2016, which issued during the prosecution of U.S. Appl. No. 14/867,752.
Office Action dated Mar. 16, 2017, which issued during the prosecution of U.S. Appl. No. 14/867,752.
Office Action dated Sep. 7, 2017, which issued during the prosecution of U.S. Appl. No. 14/867,752.
Office Action dated Jan. 31, 2018, which issued during the prosecution of U.S. Appl. No. 14/867,752.
Notice of Allowance dated Apr. 5, 2018, which issued during the prosecution of U.S. Appl. No. 14/867,752.
Office Action dated Apr. 19, 2018, which issued during the prosecution of U.S. Appl. No. 15/854,438.
Notice of Allowance dated Sep. 24, 2018, which issued during the prosecution of U.S. Appl. No. 15/854,438.
Notice of Allowance dated Jul. 13, 2018, which issued during the prosecution of U.S. Appl. No. 15/920,782.
Notice of Allowance dated Aug. 9, 2018, which issued during the prosecution of U.S. Appl. No. 15/920,563.
Office Action dated Nov. 28, 2018, which issued during the prosecution of U.S. Appl. No. 15/900,144.
Office Action dated Nov. 28, 2018, which issued during the prosecution of U.S. Appl. No. 15/900,080.
Office Action dated Sep. 28, 2018, which issued during the prosecution of U.S. Appl. No. 15/854,409.
Office Action dated Oct. 15, 2018, which issued during the prosecution of U.S. Appl. No. 15/854,403.
Notice of Allowance dated Aug. 6, 2018, which issued during the prosecution of U.S. Appl. No. 15/920,768.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Jul. 3, 2018, which issued during the prosecution of U.S. Appl. No. 15/920,518.
Office Action dated Nov. 28, 2018, which issued during the prosecution of U.S. Appl. No. 15/899,587.
Office Action dated Dec. 20, 2018 in U.S. Appl. No. 15/900,106.
Office Action dated Dec. 25, 2018 in Japanese Application No. 2015-245144.
Office Action dated Dec. 25, 2018 in Japanese Application No. 2015-245145.
Office Action dated Dec. 25, 2018 in Japanese Application No. 2015-254192.
Office Action dated Dec. 31, 2018 in U.S. Appl. No. 16/009,603.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Nov. 14, 2018 in U.S. Appl. No. 16/100,289.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 7, 2019 in U.S. Appl. No. 15/621,464.
Notice of Allowance dated Aug. 27, 2018 in U.S. Appl. No. 15/920,635.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018 in U.S. Appl. No. 15/900,242.
Office Action dated Dec. 21, 2018 in U.S. Appl. No. 15/900,160.
Office Action dated Dec. 21, 2018 in U.S. Appl. No. 15/920,616.
Office Action dated Dec. 27, 2018 in U.S. Appl. No. 15/900,334.
Office Action dated Dec. 7, 2018 in U.S. Appl. No. 15/920,592.
Office Action dated Feb. 21, 2019 in U.S. Appl. No. 15/854,383.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Nov. 19, 2018 in U.S. Appl. No. 15/900,141.
Office Action dated Nov. 29, 2018, which issued during the prosecution of U.S. Appl. No. 15/422,821.
U.S. Appl. No. 15/422,944, Allowed.
U.S. Appl. No. 15/625,428, Allowed Dec. 4, 2018; RCE Filed.
U.S. Appl. No. 15/626,720, Allowed.
U.S. Appl. No. 15/848,173, Allowed.
U.S. Appl. No. 15/380,309, Pending.
U.S. Appl. No. 15/615,871, U.S. Pat. No. 10,047,393.
U.S. Appl. No. 15/854,438, Allowed.
U.S. Appl. No. 15/854,409, Allowed.
U.S. Appl. No. 15/920,563, Allowed.
U.S. Appl. No. 15/900,080 (the present Application), Pending.
U.S. Appl. No. 15/920,518, Allowed; RCE filed.
U.S. Appl. No. 15/899,587, Pending.
U.S. Appl. No. 15/899,430, Pending.
U.S. Appl. No. 15/920,515, Pending.
U.S. Appl. No. 15/920,517, Pending.
U.S. Appl. No. 15/920,538, Pending.
U.S. Appl. No. 15/920,544, Pending.
U.S. Appl. No. 15/920,768, Allowed.
U.S. Appl. No. 16/009,603, Quayle Action issued (RCE filed).
U.S. Appl. No. 16/182,083 Pending (Not yet published; continuation of U.S. Appl. No. 15/920,768).
U.S. Appl. No. 15/705,531, Pending.
U.S. App. No. 16/232,165, Pending (Continuation of U.S. Appl. No. 15/854,438).
U.S. Appl. No. 16/100,289, Pending.
U.S. Appl. No. 16/038,669, Pending.
U.S. Appl. No. 15/900,106, Pending.
U.S. Appl. No. 15/900,412, U.S. Pat. No. 10,062,403.
U.S. Appl. No. 15/900,141, Pending.
U.S. Appl. No. 15/900,160, Pending.
U.S. Appl. No. 15/900,345, Pending.
U.S. Appl. No. 15/900,379, Pending.
U.S. Appl. No. 15/920,616, Pending.
U.S. Appl. No. 15/900,242, Pending.
U.S. Appl. No. 15/900,334, Pending.
U.S. Appl. No. 15/920,592, Pending.
U.S. Appl. No. 15/920,635, U.S. Pat. No. 10,170,144.
U.S. Appl. No. 15/052,115, U.S. Pat. No. 9,704,527.
U.S. Appl. No. 15/218,190, U.S. Pat. No. 9,721,606.
U.S. Appl. No. 15/280,195, Pending.
U.S. Appl. No. 15/422,821, Pending.
U.S. Appl. No. 15/422,944, Allowed; RCE filed Nov. 21, 2018.
U.S. Appl. No. 15/466,143, U.S. Pat. No. 9,837,116.
U.S. Appl. No. 15/619,012, Pending.

(56) References Cited

OTHER PUBLICATIONS

U.S. Appl. No. 15/624,897, Allowed; RCE filed Nov. 21, 2018.
U.S. Appl. No. 15/624,792, Allowed; RCE filed Nov. 21, 2018.
U.S. Appl. No. 15/626,832, Allowed; RCE filed Nov. 21, 2018.
U.S. Appl. No. 15/625,428, Pending.
U.S. Appl. No. 14/978,834, U.S. Pat. No. 9,721,605.
U.S. Appl. No. 14/757,555, U.S. Pat. No. 9,711,174.
U.S. Appl. No. 15/197,046, U.S. Pat. No. 9,721,607.
U.S. Appl. No. 15/380,336, Allowed; RCE filed Nov. 21, 2018.
U.S. Appl. No. 15/614,876, Pending.
U.S. Appl. No. 15/620,916, Pending.
U.S. Appl. No. 15/621,464, Pending.
U.S. Appl. No. 15/626,720, Pending.
U.S. Appl. No. 15/854,383, Pending.
U.S. Appl. No. 15/854,507, U.S. Pat. No. 9,984,716.
U.S. Appl. No. 15/854,439, Pending.
U.S. Appl. No. 15/854,506, U.S. Pat. No. 10,008,230.
U.S. Appl. No. 15/848,173, Pending.
U.S. Appl. No. 15/628,814, Pending.
U.S. Appl. No. 15/690,400, Pending.
U.S. Appl. No. 15/690,906, Pending.
U.S. Appl. No. 15/626,355, Pending.
U.S. Appl. No. 15/627,696, Pending.
U.S. Appl. No. 14/870,618, U.S. Pat. No. 9,959,894.
U.S. Appl. No. 15/388,911, Pending.
U.S. Appl. No. 14/753,227, U.S. Pat. No. 9,601,146.
U.S. Appl. No. 15/388,864, U.S. Pat. No. 9,773,519.
U.S. Appl. No. 15/072,550, U.S. Pat. No. 9,704,525.
U.S. Appl. No. 15/615,871, U.S. Pat. No. 10,074,393.
U.S. Appl. No. 15/854,410, U.S. Pat. No. 9,972,351.
Notice of Allowance dated Apr. 16, 2019 in U.S. Appl. No. 15/625,428.
Notice of Allowance dated Mar. 13, 2019 in U.S. Appl. No. 16/100,289.
Notice of Allowance dated Mar. 18, 2019 in U.S. Appl. No. 15/626,355.
Notice of Allowance dated Mar. 18, 2019 in U.S. Appl. No. 15/628,814.
Office Action dated Feb. 5, 2019 in U.S. Appl. No. 16/038,339.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated Mar. 7, 2019 in U.S. Appl. No. 15/854,439.
"Introduction to TMR Magnetic Sensors", Anonymous, Mar. 12, 2015, MR Sensor Technology, pp. 1-5 (Year: 2015).
Notice of Allowance dated Mar. 5, 2019 in U.S. Appl. No. 16/009,603.
Office Action dated Feb. 26, 2019 in Japanese Application No. 2016-123207.
Office Action dated Mar. 6, 2019 in U.S. Appl. No. 15/854,403.
Office Action dated Feb. 28, 2019 in U.S. Appl. No. 15/920,518.
Office Action dated Apr. 15, 2019 in U.S. Appl. No. 16/182,083.
Office Action dated Apr. 16, 2019 in U.S. Appl. No. 16/232,165.
Office Action dated Mar. 5, 2019 in U.S. Appl. No. 15/443,026.
Office Action dated Apr. 23, 2019 in Japanese Application No. 2016-169851.
Office Action dated Apr. 23, 2019 in Japanese Application No. 2016-182230.
Notice of Allowance dated Jun. 6, 2019 in U.S. Appl. No. 15/854,383.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/900,230.
Office Action dated Jun. 10, 2019 in U.S. Appl. No. 15/920,518.
Office Action dated Jun. 6, 2019 in U.S. Appl. No. 15/899,587.
Office Action dated May 23, 2019 in U.S. Appl. No. 15/388,911.
Notice of Allowance dated Jun. 25, 2019 in U.S. Appl. No. 15/620,916.
Office Action dated Jun. 25, 2019 in Japanese Application No. 2015-245144 Translation.
Notice of Allowance dated Jun. 27, 2019 in U.S. Appl. No. 15/854,439.
U.S. Appl. No. 16/037,564, Pending.
U.S. Appl. No. 16/038,339, Allowed.
U.S. Appl. No. 16/037,573, Pending.
U.S. Appl. No. 16/037,681, Pending.
U.S. Appl. No. 16/038,884, Pending.
U.S. Appl. No. 16/038,847, Pending.
U.S. Appl. No. 16/044,574, Allowed.
U.S. Appl. No. 16/142,560, Pending.
U.S. Appl. No. 16/184,312, Pending.
U.S. Appl. No. 16/143,646, Allowed.
U.S. Appl. No. 16/144,428, Pending.
U.S. Appl. No. 16/143,747, Pending.
U.S. Appl. No. 16/440,161, Pending.
U.S. Appl. No. 15/900,412, Patented as No. 10,062,403[2].
U.S. Appl. No. 15/900,141, Allowed.
U.S. Appl. No. 15/900,160, Allowed.
U.S. Appl. No. 15/900,345, Allowed.
U.S. Appl. No. 15/900,379, Allowed.
U.S. Appl. No. 16/012,018, Pending.
U.S. Appl. No. 15/920,616, Allowed.
U.S. Appl. No. 15/900,242, Allowed.
U.S. Appl. No. 15/900,334, Allowed.
U.S. Appl. No. 15/920,592, Allowed.
U.S. Appl. No. 15/920,635, Patented as U.S. Pat. No. 10,170,144.
U.S. Appl. No. 16/160,377, Pending.
U.S. Appl. No. 15/443,094, Pending.
U.S. Appl. No. 15/442,961, Pending.
U.S. Appl. No. 16/038,687, Pending.
U.S. Appl. No. 16/038,514, Pending.
U.S. Appl. No. 16/038,545, Pending.
U.S. Appl. No. 16/037,596, Pending.
U.S. Appl. No. 16/038,771, Pending.

* cited by examiner

MAGNETIC TAPE HAVING CHARACTERIZED MAGNETIC LAYER, TAPE CARTRIDGE, AND RECORDING AND REPRODUCING DEVICE

CROSS-REFERENCE TO RELATED APPLICATIONS

This application claims priority under 35 U.S.C 119 to Japanese Patent Application No. 2015-245142 filed on Dec. 16, 2015, Japanese Patent Application No. 2016-014401 filed on Jan. 28, 2016, and Japanese Patent Application No. 2016-241073 filed on Dec. 13, 2016. Each of the above applications is hereby expressly incorporated by reference, in its entirety.

BACKGROUND OF THE INVENTION

Field of the Invention

The present invention relates to a magnetic tape, a magnetic tape cartridge, and a magnetic recording and reproducing device.

Discussion of the Background

Magnetic recording media include tape-shaped media and disk-shaped media. Magnetic recording media in the form of tapes, that is, magnetic tapes, are primarily employed in storage applications such as data-backup tapes.

When recording a signal on or reproducing a signal from a magnetic tape, a magnetic tape cartridge housing the magnetic tape is normally loaded into a drive, and the magnetic tape is run within the drive, bringing the surface of the magnetic tape (surface of the magnetic layer) into contact with (causing it to slide over) a magnetic head. Hereinafter, the term "magnetic tape" will also be referred to simply as a "tape" and the term "magnetic head" will also be referred to simply as a "head".

In the above recording and reproduction, since running in which the surface of the magnetic layer slides over the head is conducted repeatedly, a portion of the surface of the magnetic layer is shaved off or the like, generating foreign material that sometimes adheres to the head. When the magnetic tape is repeatedly run with foreign material adhering to the head in this manner, the foreign material alters the distance between the magnetic tape and the head, sometimes causing the output to fluctuate (which is referred to as "spacing loss"). Such spacing loss causes a drop in the electromagnetic characteristics with repeated running. As a countermeasure to this, abrasive has conventionally been incorporated into the magnetic layer to impart to the surface of the magnetic layer the function of removing foreign material adhering to the head (for example, see Japanese Unexamined Patent Publication (KOKAI) No. 2014-179149 or English language family member US2014/272474A1 and Japanese Unexamined Patent Publication (KOKAI) No. 2005-243162, which are expressly incorporated herein by reference in their entirety). The function of removing foreign material that has adhered to the head from the surface of the magnetic layer will be referred to as the "abrasiveness of the surface of the magnetic layer" or simply "abrasiveness" hereinafter.

SUMMARY OF THE INVENTION

In order to increase the recording capacity per magnetic tape cartridge, it is desirable to reduce the overall thickness of the magnetic tape (that is, render the magnetic tape thinner) and thus increase the total length of the tape contained in each magnetic tape cartridge. Normally, in a magnetic tape with a multilayer structure in which a nonmagnetic layer and magnetic layer are sequentially present on a nonmagnetic support, the nonmagnetic layer accounts for a large portion of the thickness of the various layers. Thus, reducing the thickness of the nonmagnetic layer can be an effective way to reduce the thickness of the magnetic tape.

Magnetic tapes for data storage are often used at low temperature and low humidity (such as in environments with temperatures of 10° C. to 15° C. and relative humidity levels of about 10% to 20%) such as at data centers where the temperature and humidity are controlled. Accordingly, it is desirable for magnetic tapes to maintain their abrasiveness at low temperature and low humidity.

In light of the above, the present inventor examined reducing the thickness of the nonmagnetic layer in a magnetic tape and running the magnetic tape at low temperature and low humidity. As a result, he discovered that when abrasive was incorporated into the magnetic layer as has been the conventional practice, particularly in magnetic tapes in which the thickness of the nonmagnetic layer had been reduced to less than or equal to 0.50 μm, the abrasiveness of the surface of the magnetic layer ended up decreasing with repeated running at low temperature and low humidity.

An aspect of the present invention provides for a magnetic tape with a nonmagnetic layer that is less than or equal to 0.50 μm in thickness and in which the abrasiveness of the surface of the magnetic layer is maintained even with repeated running at low temperature and low humidity.

An aspect of the present invention relates to:

A magnetic tape, which includes a nonmagnetic layer containing nonmagnetic powder and binder on a nonmagnetic support, and a magnetic layer containing ferromagnetic powder, abrasive, and binder on the nonmagnetic layer, wherein:

the thickness of the nonmagnetic layer is less than or equal to 0.50 μm;

the coefficient of friction as measured on a base portion of a surface of the magnetic layer is less than or equal to 0.35; and ΔSFD in a longitudinal direction of the magnetic tape as calculated with Equation 1 is greater than or equal to 0.50:

$$\Delta SFD = SFD_{25°\ C.} - SFD_{-190°\ C.} \quad \text{Equation 1}$$

(In Equation 1, $SFD_{25°\ C.}$ denotes a switching field distribution SFD as measured in the longitudinal direction of the magnetic tape in an environment with a temperature of 25° C., and $SFD_{-190°\ C.}$ denotes a switching field distribution SFD as measured in the longitudinal direction of the magnetic tape in an environment with a temperature of −190° C.)

That is, it was found that the abrasiveness of the surface of the magnetic layer of the above magnetic tape could be maintained with repeated running at low temperature and low humidity even with a nonmagnetic layer with a thickness of less than or equal to 0.50 μm.

The "base portion" as referred to in the present invention is the portion of the surface of the magnetic layer specified by the following method.

Defining the plane where the volumes of protruding components and indenting components equal out in the field of view as measured by an atomic force microscope (AFM) as the reference plane, protrusions are defined as protrusions greater than or equal to 15 nm in height from the reference plane. The portion where the number of protrusions greater than or equal to 15 nm in height from the reference plane is zero, that is, the portion where no protrusions greater than or equal to 15 nm in height from the reference plane are detected on the surface of the magnetic layer, is specified as the base portion.

The coefficient of friction that is measured on the base portion refers to the value that is measured by the following method.

On the base portion (measurement spot: a 10 µm length in the longitudinal direction of a magnetic tape), a spherical indenter made of diamond that is 1 µm in radius is passed back and forth once at a load of 100 µN and at a speed of 1 µm/sec. to measure the frictional force (horizontal force) and normal force. The frictional force and normal force that are measured are arithmetic averages obtained by constantly measuring the frictional force and normal force during one back and forth pass. This measurement can be conducted, for example, with a model TI-95 Triboindenter made by Hysitron Corp. The µ value of the coefficient of friction is calculated from the arithmetic average of the frictional force and the arithmetic average of the normal force that are measured. The coefficient of friction is a value that is obtained from the equation: F=µN from the frictional force (horizontal force) F (unit: Newtons (N)) and the normal force N (unit: Newtons (N)). The above measurement and calculation of coefficient of frictionµ value is conducted for three portions of the base portion randomly determined on the surface of the magnetic layer and the arithmetic average of the three measured values obtained is adopted as the coefficient of friction measured on the base portion. The coefficient of friction measured on the base portion will also be referred to as the "base portion friction" below.

Although not intended to limit the present invention in any way, the present inventor conceives of the above magnetic tape as follows:

(1) He presumes the drop in abrasiveness of the surface of the magnetic layer to be due to abrasion resulting from the shaving away of abrasive present in the vicinity of the surface of the magnetic layer caused by contact with the head during repeated running at low temperature and low humidity. It is thought that such abrasion of abrasive can be prevented by causing the abrasive that is subjected to pressure by the head during contact between abrasive and head to suitably sink into the magnetic layer. However, the abrasive that is present in the vicinity of the surface of the magnetic layer in a magnetic tape having a nonmagnetic layer that is less than or equal to 0.50 µm in thickness is thought to be less likely to sink into the magnetic layer than in a magnetic tape having a thicker nonmagnetic layer. Although merely a presumption, the present inventor presumes that what is known as the cushioning effect imparted by the nonmagnetic layer located beneath the magnetic layer is decreased by reducing the thickness of the nonmagnetic layer.

While conducting extensive research, the fact that in the magnetic layer, abrasive present in the vicinity of the surface of the magnetic layer was supported from beneath by ferromagnetic powder caused the present inventor to think that such support might inhibit the sinking in due to pressure from the head resulting from contact between abrasive present in the vicinity of the surface of the magnetic layer and the head. Further extensive research led to the presumption that the effect of ferromagnetic powder supporting the abrasive from beneath was strengthened to the degree that the ferromagnetic particles constituting the ferromagnetic powder in the magnetic layer were present in a longitudinally aligned fashion while mutually interacting. Based on this, it was thought that the effect of the abrasive being supported from beneath by ferromagnetic powder would be mitigated and sinking of the abrasive present in the vicinity of the surface of the magnetic layer into the magnetic layer would be facilitated if the ferromagnetic powder were present in a suitably random state in the longitudinal direction in the magnetic layer.

Based on the above knowledge, the present inventor conducted extensive research based on the idea of mitigating the effect of ferromagnetic powder supporting the abrasive in the magnetic layer from beneath by compensating for the cushioning effect of a nonmagnetic layer that had been reduced by decreasing the thickness of the nonmagnetic layer to less than or equal to 0.50 µm. As a result, he discovered making the ΔSFD calculated by Equation 1 in the longitudinal direction of the magnetic tape greater than or equal to 0.50. In conjunction with this, the present inventor presumes that the ΔSFD can serve as an indicator of the state in which ferromagnetic powder is present in the magnetic layer. A state in which ΔSFD is greater than or equal to 0.50 is a state in which ferromagnetic powder is present in a suitably random state in the longitudinal direction within the magnetic layer. The presence of such a state is presumed to mitigate the effect of ferromagnetic powder supporting the abrasive from beneath. It is thus presumed possible to compensate for a reduction in the cushioning effect of a nonmagnetic layer that has been reduced by reducing the thickness of the nonmagnetic layer to less than or equal to 0.50 µm, and inhibit abrasion by shaving due to contact between the head and abrasive present in the vicinity of the surface of the magnetic layer with repeated running at low temperature and low humidity.

(2) The present inventor also presumes the following with regard to base portion friction. He presumes that when the thickness of the nonmagnetic layer decreases to less than or equal to 0.50 µm, the strength of the magnetic tape diminishes, and the magnetic tape tends to become flexible. With repeated running at low temperature and low humidity, contact between the magnetic head and the base portion is facilitated. As a result, the impact of the coefficient of friction of the base portion on sliding of the surface of the magnetic layer and the head increases. The present inventor presumes that the greater the coefficient of friction of the base portion becomes, the more the sliding property deteriorates (the rougher sliding tends to become). The more the sliding property deteriorates, the greater the force that is exerted on the abrasive during contact with the head. The present inventor also presumes this to be one reason for abrasion by shaving away of the abrasive. To remedy this, keeping the coefficient of friction as measured on the base portion of the surface of the magnetic layer to less than or equal to 0.35 can enhance the sliding property. As a result, the present inventor presumes that the abrasion of abrasive present in the vicinity of the surface of the magnetic layer by shaving due to contact with the magnetic head can be inhibited with repeated running at low temperature and low humidity in a magnetic tape having a nonmagnetic layer that is less than or equal to 0.50 µm in thickness.

As set forth above, the present inventor presumes that keeping the coefficient of friction measured on the base portion of the surface of the magnetic layer to less than or equal to 0.35 and keeping the above ΔSFD in the longitudinal direction of a magnetic tape to greater than or equal to 0.50 can contribute to inhibiting the abrasion by shaving of abrasive that is present in the vicinity of the surface of the magnetic layer due to contact with the head with repeated running at low temperature and low humidity of a magnetic tape having a nonmagnetic layer that is less than or equal to 0.50 μm in thickness. As a result, the present inventor presumes that it is possible to maintain the abrasiveness of the surface of the magnetic layer even with repeated running at low temperature and low humidity. However, these are merely presumptions, and are not intended to limit the present invention in any way.

In the present invention and the present specification, the term "powder" means an aggregation of multiple particles. For example, the term "ferromagnetic powder" means an aggregation of multiple ferromagnetic particles. The term "an aggregation of multiple particles" is not limited to forms in which the particles constituting the aggregation are in direct contact, and includes forms in which the binder, additives, and the like described further below are present between the particles. The term "particles" will sometimes be used to denote powder.

In one embodiment, the abrasive contains alumina.

In one embodiment, the coefficient of friction that is measured on the base portion of the surface of the magnetic layer of the magnetic tape is greater than or equal to 0.10 but less than or equal to 0.35.

In one embodiment, the above ΔSFD is greater than or equal to 0.50 but less than or equal to 1.50.

In one embodiment, the combined thickness of the magnetic layer and nonmagnetic layer is less than or equal to 0.60 μm.

In one embodiment, a backcoat layer containing nonmagnetic powder and binder is present on the opposite side of the nonmagnetic support from the side on which the nonmagnetic layer and magnetic layer are present in the above magnetic tape.

In one embodiment, the total thickness of the magnetic tape is less than or equal to 6.00 μm.

In one embodiment, the above ferromagnetic powder is selected from the group consisting of ferromagnetic hexagonal ferrite powder and ferromagnetic metal powder.

A further aspect of the present invention relates to a magnetic tape cartridge housing the above magnetic tape.

In one embodiment, the total length of the magnetic tape that is housed in the magnetic tape cartridge is greater than or equal to 10 m.

A still further aspect of the present invention relates to a magnetic recording and reproducing device containing the above magnetic tape cartridge and a magnetic head.

One aspect of the present invention can provide a magnetic tape, containing a nonmagnetic layer that is less than or equal to 0.50 μm in thickness, that is capable of maintaining the abrasiveness of the surface of the magnetic layer even with repeated running at low temperature and low humidity Still other aspects of the present invention can provide a magnetic tape cartridge housing such a magnetic tape, and a magnetic recording and reproducing device equipped with such a magnetic tape cartridge.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the multiple reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

Magnetic Tape

An aspect of the present invention relates to:

A magnetic tape, which includes a nonmagnetic layer containing nonmagnetic powder and binder on a nonmagnetic support, and a magnetic layer containing ferromagnetic powder, abrasive, and binder on the nonmagnetic layer, wherein:

the thickness of the nonmagnetic layer is less than or equal to 0.50 μm;

the coefficient of friction as measured on a base portion of a surface of the magnetic layer (base portion friction) is less than or equal to 0.35; and ΔSFD in a longitudinal direction of the magnetic tape as calculated with Equation 1 is greater than or equal to 0.50:

$$\Delta SFD = SFD_{25°\ C.} - SFD_{-190°\ C.} \qquad \text{Equation 1}$$

(In Equation 1, $SFD_{25°\ C.}$ denotes a switching field distribution SFD as measured in the longitudinal direction of the magnetic tape in an environment with a temperature of 25° C., and $SFD_{-190°\ C.}$ denotes a switching field distribution SFD as measured in the longitudinal direction of the magnetic tape in an environment with a temperature of −190° C.)

In the present invention and specification, unless specifically stated otherwise, the magnetic characteristics without explicit reference to a measurement temperature refer to values that are measured in an environment at a temperature of 25° C.

The above magnetic tape will be described in greater detail below.

<Base Portion Friction>

The coefficient of friction (base portion friction) that is measured on the base portion of the surface of the magnetic layer of the above magnetic tape is less than or equal to 0.35. The method of measuring the base portion friction is as set forth above. From the perspective of further inhibiting the drop in the electromagnetic characteristics with repeated running, the base portion friction is desirably less than or equal to 0.33, preferably less than or equal to 0.30. The base portion friction is, by way of example, greater than or equal to 0.10 or greater than or equal to 0.20. However, from the perspective of inhibiting the drop in abrasiveness with repeated running at low temperature and low humidity, the lower it is, the better. There is thus no specific lower limit.

With respect to measurement of the base portion friction, the reason that the protrusions are defined as protrusions having a height of greater than or equal to 15 nm from the reference surface is that the protrusions that are normally recognized as protrusions present on the surface of the magnetic layer are primarily those having a height of greater than or equal to 15 nm from the reference surface. For example, such protrusions are formed on the surface of the magnetic layer by nonmagnetic powder such as abrasive. By contrast, the present inventor presumes that irregularities that are more microscopic than the irregularities that are formed by such protrusions are present on the surface of the magnetic layer. The present inventor also presumes that the base portion friction can be adjusted by controlling the shape of these microscopic irregularities. Based on this presumption, the present inventor formed a magnetic layer using two or more kinds of ferromagnetic powder with different average particle sizes to control the shape of the irregularities of the base portion. As a result, it was possible to control the base portion friction to various values. Accordingly, an example of one way of adjusting the base portion friction is to use two or more kinds of ferromagnetic powder with different average particle sizes as ferromagnetic powder. More specifically, the present inventor presumes that it is possible to form the above microscopic irregularities on the base portion by means of protrusions in the form of ferromagnetic powder of large average particle size, and that it is possible to increase the abundance of protrusions on the base portion by increasing the mixing ratio of ferromagnetic powder of larger average particle size (and conversely, to lower the abundance of protrusions on the base portion by decreasing the mixing ratio). This will be described in greater detail further below.

As another way, the present inventor formed a magnetic layer using additional nonmagnetic powder with an average particle size greater than that of the ferromagnetic powder together with the nonmagnetic powder, such as abrasive, capable of forming protrusions having a height of greater than or equal to 15 nm from the reference surface on the surface of the magnetic layer to control the shape of irregularities on the base portion. It was thus possible to control the base portion friction to various values. Accordingly, another example of a way of adjusting the base portion friction is to use this additional nonmagnetic powder when forming the magnetic layer. More specifically, the present inventor presumes that the additional nonmagnetic powder becomes protrusions that form the above microscopic irregularities on the base portion, and that by increasing the mixing ratio of such nonmagnetic powder, it is possible to increase the abundance of protrusions on the base portion (and conversely, to lower the abundance of protrusions on the base portion by decreasing the mixing ratio). This will be described in greater detail further below.

Additionally, it is possible to adjust the base portion friction by combining the above two methods.

However, the above adjustment methods are examples. Any means of adjustment can be used to achieve a base portion friction of less than or equal to 0.35, and such embodiments are included in the present invention.

<$\Delta$SFD Calculated with Equation 1>

The $\Delta$SFD is a value indicating the temperature dependence of the switching field distribution SFD that is measured in the longitudinal direction of the magnetic tape. The lower the value, the smaller the change in the SFD due to temperature, and the higher the value, the greater the change in the SFD due to temperature that is indicated. The present inventor presumes that an $\Delta$SFD of greater than or equal to 0.50 as calculated with Equation 1 indicating the difference between the $SFD_{25° C.}$ and the $SFD_{-190° C.}$ can contribute to inhibiting a drop in the abrasiveness due to repeated running at low temperature and low humidity. The presumptions of the present inventor in this regard are as set forth above. From the perspective of further inhibiting the drop in abrasiveness with repeated running at low temperature and low humidity, the $\Delta$SFD is desirably greater than or equal to 0.55, preferably greater than or equal to 0.60, more preferably greater than or equal to 0.70, still more preferably greater than or equal to 0.80, yet more preferably greater than or equal to 0.90, yet still more preferably greater than or equal to 1.00, and in order of increasing preference, greater than or equal to 1.10, greater than or equal to 1.20, greater than or equal to 1.30, and greater than or equal to 1.40. As stated above, the lower the value of the $\Delta$SFD calculated with Equation 1, the smaller the change in SFD due to temperature that is indicated. The smaller the change in SFD due to temperature the better from the perspective of stably maintaining the signal that has been recorded on the magnetic tape (recording retention). From this perspective, the $\Delta$SFD that is calculated with Equation 1 is desirably less than or equal to 1.60, preferably less than or equal to 1.50.

The SFD in the longitudinal direction of the magnetic tape can be measured with a known magnetic characteristics measuring apparatus, such as a vibrating sample magnetometer. The same applies to measurement of the SFD of ferromagnetic powder. The temperature during SFD measurement can be adjusted by setting the measuring apparatus.

Based on research by the present inventor, the $\Delta$SFD could be controlled by the method used to prepare the magnetic tape. The following tendencies were observed:

(A) the more dispersion of the ferromagnetic powder was increased in the magnetic layer, the lower the value became;

(B) the lower the SFD temperature dependence of the ferromagnetic powder employed, the lower the value became; and (C) the more aligned the ferromagnetic powder in the longitudinal direction of the magnetic layer (the greater the orientation in the longitudinal direction), the smaller the value became, and the lower the orientation property in the longitudinal direction, the higher the value became.

For example, as regards (A), examples are intensifying the dispersion conditions (lengthening the dispersion period, reducing the diameter and increasing packing of the dispersion beads used in dispersion, and the like) and using a dispersing agent. Known dispersing agents, commercial dispersing agents, and the like can be used without limitation as the dispersing agent.

Additionally, as an example of (B), the ferromagnetic powder—in which the difference $\Delta SFD_{powder}$ between the SFD as measured in an environment with a temperature of 100° C. and the SFD as measured in an environment with a temperature of 25° C. as calculated with Equation 2 below falls within a range of 0.05 to 1.50—can be employed. However, even outside the above range, $\Delta$SFD can be kept within the range of greater than or equal to 0.50.

$$\Delta SFD_{powder} = SFD_{powder\ 100°\ C.} - SFD_{powder\ 25°\ C.} \qquad \text{Equation 2}$$

(In Equation 2, $SFD_{powder\ 100°\ C.}$ denotes the switching field distribution SFD of the ferromagnetic powder as measured in an environment with a temperature of 100° C. and $SFD_{powder\ 25°\ C.}$ denotes the switching field distribution SFD of the ferromagnetic powder as measured in an environment with a temperature of 25° C.)

As regards (C), the method of conducting vertical orientation treatment of the magnetic layer or the method of no orientation by conducting no orientation treatment can be adopted.

Accordingly, for example, by employing one of means (A) to (C), or combining any two or more to effect controls, it is possible to obtain a magnetic tape in which ΔSFD falls within a range of greater than or equal to 0.50.

The magnetic tape will be described in greater detail below.

<Magnetic Layer.
(Ferromagnetic Powder)

As set forth above, one way to adjust the base portion friction is control with the ferromagnetic powder. The various powders that are commonly employed as ferromagnetic powders in the magnetic layers of magnetic tapes can be employed as the ferromagnetic powder contained in the magnetic layer of the above magnetic tape.

For example, from the perspective of enhancing the recording density of the magnetic tape, it is desirable to employ ferromagnetic powder with a small average particle size as the ferromagnetic powder employed in the greatest proportion in the magnetic layer. From this perspective, when employing ferromagnetic powders in the magnetic layer in the form of two or more kinds of ferromagnetic powder of differing average particle size, it is desirable to employ ferromagnetic powder with an average particle size of less than or equal to 50 nm as the ferromagnetic powder employed in the greatest proportion. From the perspective of stable magnetization, the average particle size of the ferromagnetic powder employed in the greatest proportion is desirably greater than or equal to 10 nm. When not employing two or more kinds of ferromagnetic powder of differing average particle size, but rather one ferromagnetic powder, the average particle size of the ferromagnetic powder employed is desirably less than or equal to 50 nm, and desirably greater than or equal to 10 nm, for the above reasons.

By contrast, the ferromagnetic powder that is employed along with the ferromagnetic powder employed in the greatest proportion desirably has an average particle size that is greater than that of the ferromagnetic powder that is employed in the greatest proportion. That is because it is assumed that protrusions formed on the base portion by ferromagnetic powder of large average particle size can reduce the base portion friction. From this perspective, the difference between the average particle size of the ferromagnetic powder employed in the greatest proportion and the average particle size of the ferromagnetic powder employed with it, denoted as the "(average particle size of the latter)–(average particle size of the former)", desirably falls within a range of 10 nm to 80 nm, preferably falls within a range of 10 nm to 50 nm, more preferably falls within a range of 10 nm to 40 nm, and still more preferably, falls within a range of 12 nm to 35 nm. It is also naturally possible to employ two or more kinds of ferromagnetic powder of differing average particle size as the ferromagnetic powder that is employed with the ferromagnetic powder employed in the greatest proportion. In that case, the average particle size of at least one of the two or more kinds of ferromagnetic powder desirably satisfies the above difference with the average particle size of the ferromagnetic powder employed in the greatest proportion. It is desirable for the average particle sizes of more of the ferromagnetic powders to satisfy this difference, and preferably for all of the average particle sizes of the ferromagnetic powders to satisfy this difference.

From the perspective of controlling the base portion friction, it is desirable for the mixing ratio of the ferromagnetic powder employed in the greatest proportion to the additional ferromagnetic powder (when two or more kinds of additional ferromagnetic powder with differing average particle size are employed, the combined total thereof) to fall within a range based on weight of former:latter=90.0:10.0 to 99.9:0.1, preferably within a range of 95.0:5.0 to 99.5:0.5, with regard to two or more kinds of ferromagnetic powder of differing average particle size.

A portion of the above additional ferromagnetic powder can be replaced with nonmagnetic powder, described further below.

The term "ferromagnetic powders of differing average particle size" refers to all or some part of the ferromagnetic powder lot having different average particle sizes. A particle size distribution based on volume or based on number of ferromagnetic powder contained in the magnetic layer of a magnetic tape formed using ferromagnetic powders of differing average particle sizes in this manner can be measured by a known measurement method such as the dynamic light scattering method or laser diffraction. When this is done, at the average particle size of the ferromagnetic powder employed in the greatest proportion, or in the vicinity thereof, a maximum peak will normally be found in the particle size distribution curve obtained by measurement. There will also be cases where a peak will be found at the average particle size of various ferromagnetic particles or in the vicinity thereof. Accordingly, when measuring the particle size distribution of ferromagnetic powder contained in the magnetic layer of a magnetic tape formed using the first ferromagnetic powder with an average particle size of 10 nm to 50 nm, for example, in the greatest proportion, a maximum peak will normally be found within the particle size range of 10 nm to 50 nm in the particle size distribution curve.

A portion of the above additional ferromagnetic powder can be replaced with nonmagnetic powder, described further below.

The average particle size of the ferromagnetic powder in the present invention and specification is a value measured with a transmission electron microscope by the following method.

Ferromagnetic powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the ferromagnetic powder. A Model H-9000 transmission electron microscope made by Hitachi can be employed as the above transmission electron microscope, for example. The particle size can be measured with known image analysis software, such as KS-400 image analysis software from Carl Zeiss.

In the present invention and specification, the average particle size of the powder, such as ferromagnetic powder and various kinds of powder, is the average particle size as obtained by the above method. The average particle size indicated in Examples further below was obtained using a Model H-9000 transmission electron microscope made by Hitachi and KS-400 image analysis software made by Carl Zeiss.

The method described in paragraph 0015 of Japanese Unexamined Patent Publication (KOKAI) No. 2011-048878, which is expressly incorporated herein by reference in its entirety, for example, can be employed as the method of collecting sample powder such as ferromagnetic powder from a magnetic layer for particle size measurement.

In the present invention and specification, the size of the particles constituting powder such as ferromagnetic powder (referred to as the "particle size", hereinafter) is denoted as follows based on the shape of the particles observed in the above particle photograph:
(1) When acicular, spindle-shaped, or columnar (with the height being greater than the maximum diameter of the bottom surface) in shape, the particle size is denoted as the length of the major axis constituting the particle, that is, the major axis length.
(2) When platelike or columnar (with the thickness or height being smaller than the maximum diameter of the plate surface or bottom surface) in shape, the particle size is denoted as the maximum diameter of the plate surface or bottom surface.
(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

A desirable specific example of the ferromagnetic powder is ferromagnetic hexagonal ferrite powder. When the ferromagnetic powder employed in the greatest proportion is ferromagnetic hexagonal ferrite powder, the average particle size (for example, average plate diameter), from the perspective of achieving high density recording and stable magnetization, is desirably greater than or equal to 10 nm and less than or equal to 50 nm, preferably greater than or equal to 20 nm and less than or equal to 50 nm. Reference can be made, for example, to Japanese Unexamined Patent Publication (KOKAI) No. 2011-225417, paragraphs 0012 to 0030, Japanese Unexamined Patent Publication (KOKAI) No. 2011-216149, paragraphs 0134 to 0136, and Japanese Unexamined Patent Publication (KOKAI) No. 2012-204726, paragraphs 0013 to 0030, for details on ferromagnetic hexagonal ferrite powder. The contents of the above publications are expressly incorporated herein by reference in their entirety.

Ferromagnetic metal powder is a specific example of desirable ferromagnetic powder. When the ferromagnetic powder that is employed in the greatest proportion is ferromagnetic metal powder, the average particle size thereof (for example, average major axis length), from the perspective of achieving higher density recording and stable magnetization, is desirably greater than or equal to 10 nm and less than or equal to 50 nm, preferably greater than or equal to 20 nm and less than or equal to 50 nm. Reference can be made, for example, to Japanese Unexamined Patent Publication (KOKAI) No. 2011-216149, paragraphs 0137 to 0141, and Japanese Unexamined Patent Publication (KOKAI) No. 2005-251351, paragraphs 0009 to 0023, for details on ferromagnetic metal powders. The contents of the above publications are expressly incorporated herein by reference in their entirety.

The above magnetic tape can contain ferromagnetic powder in the form of ferromagnetic hexagonal ferrite powder alone, ferromagnetic metal powder alone, or both.

In one embodiment, it is desirable to employ ferromagnetic powder having a difference $L\backslash SFD_{powder}$ between the SFD that is measured in an environment with a temperature of 100° C. and the SFD that is measured in an environment with a temperature of 25° C. as calculated with Equation 2 above that falls within the range set forth above.

The content (fill rate) of ferromagnetic powder in the magnetic layer desirably falls within a range of 50 to 90 weight percent, preferably within a range of 60 to 90 weight percent. A high fill rate is desirable from the perspective of raising the recording density.

(Abrasive)

The magnetic layer of the above magnetic tape contains abrasive. The abrasive is desirably nonmagnetic powder with a Mohs hardness of greater than 8, preferably nonmagnetic powder with a Mohs hardness of greater than or equal to 9. The maximum Mohs hardness is the 10 of diamond. Specific examples are alumina ($Al_2O_3$), silicon carbide, boron carbide ($B_4C$), TiC, cerium oxide, zirconium oxide ($ZrO_2$), and diamond powder. Of these, alumina is desirable. Alumina is desirable abrasive in that particularly good dispersion enhancement can be achieved in combination with the dispersing agents (aromatic hydrocarbon compounds containing phenolic hydroxyl groups) described in Japanese Unexamined Patent Publication (KOKAI) No. 2013-131285, paragraphs 0012 to 0022. Reference can also be made to Japanese Unexamined Patent Publication (KOKAI) No. 2013-229090, paragraph 0021, with regard to alumina. The contents of the above publications are expressly incorporated herein by reference in their entirety. Additionally, the specific surface area can be employed as an indicator of the size of abrasive particles. The greater the specific surface area, the smaller the particle size that is indicated. The term "specific surface area" is a value that is obtained by measuring primary particles by the nitrogen adsorption method (also known as the Brunauer-Emmett-Teller (BET) single-point method). The specific surface area obtained by such a method will also be referred to hereinafter as the BET specific surface area. From the perspective of increasing the smoothness of the surface of the magnetic layer, use of an abrasive with a BET specific surface area of greater than or equal to 14 $m^2/g$ is desirable. From the perspective of dispersion, use of an abrasive with a BET specific surface area of less than or equal to 40 $m^2/g$ is desirable. The content of abrasive in the magnetic layer is desirably 1.0 to 20.0 weight parts per 100.0 weight parts of ferromagnetic powder.

(Binder, Curing Agent)

The above magnetic tape is a particulate magnetic tape that contains binder along with ferromagnetic powder in the magnetic layer. The various resins that are commonly employed as binders in particulate magnetic recording media can be employed as binders. For example, polyurethane resins, polyester resins, polyamide resins, vinyl chloride resins, acrylic resins such as those provided by copolymerizing styrene, acrylonitrile, methyl methacrylate and the like, cellulose resins such as nitrocellulose, epoxy resins, phenoxy resins, polyvinylacetal, polyvinylbutyral, and other polyvinyl alkylal resins can be employed singly, or as mixtures of multiple resins, as the binder contained in the magnetic layer. Among these, desirable resins are polyurethane resin, acrylic resins, cellulose resins, and vinyl chloride resins. These resins can also be employed as binders in the nonmagnetic layer and the backcoat layer described further below. Reference can be made to paragraphs 0028 to 0031 of Japanese Unexamined Patent Publication (KOKAI) No. 2010-24113, which is expressly incorporated herein by reference in its entirety, with regard to the above binders. The average molecular weight of the resin that is employed as binder, given as a weight average molecular weight, is by way of example greater than or equal to 10,000 and less than or equal to 200,000. In the present invention and specification, the term "weight average molecular weight" is a value measured by gel permeation chromatography (GPC) and converted to a polystyrene equivalent. An example of measurement conditions is given below. The weight average molecular weights given in Examples below are values measured under the following conditions and converted to polystyrene equivalents.

GPC device: HLC-8120 (made by Tosoh)

Column: TSK gel Multipore HXL-M (7.8 mm ID (inner diameter)×30.0 cm, made by Tosoh)

Eluent: Tetrahydrofuran (THF)

A curing agent can be employed with the above resin suitable for use as the binder. In one embodiment, the curing agent is a thermosetting compound in the form of a compound undergoing a curing reaction (crosslinking reaction) when heated. In another embodiment, it is a light-curable compound undergoing a curing reaction (crosslinking reaction) when irradiated with light. A thermosetting compound is desirable as curing agent, and polyisocyanate is suitable. For details relating to polyisocyanate, reference can be made to Japanese Unexamined Patent Publication (KOKAI) No. 2011-216149, paragraphs 0124 and 0125. The content of curing agent in the magnetic layer-forming composition is, for example, 0 to 80.0 weight parts, and from the perspective of enhancing the coating strength, desirably falls within a range of 50.0 to 80.0 weight parts, per 100.0 weight parts of binder.

(Additives)

Ferromagnetic powder, abrasive, and binder are incorporated into the magnetic layer. As needed, one or more additives can also be incorporated. An example of an additive is the above curing agent. The curing agent can be incorporated into the magnetic layer in a state in which at least a portion of the curing agent has been reacted (crosslinked) with another component such as the binder by conducting a curing reaction in the process of forming the magnetic layer. Nonmagnetic powders (nonmagnetic particles) other than abrasives, lubricants, dispersing agents, dispersion adjuvants, antifungal agents, antistatic agents, oxidation-inhibiting agents, carbon black, and the like are examples of additives that can be incorporated into the magnetic layer. Additives can be employed in the form of commercial products that have been selected based on the properties desired.

Nonmagnetic powder (referred to hereinafter as a "protrusion forming agent") is an example of an additive for controlling the friction characteristic (lowering the coefficient of friction). The protrusion-forming agent can be an inorganic or organic substance. In one embodiment, from the perspective of achieving a uniform friction characteristic, the particle size distribution of the protrusion-forming agent is desirably that of a monodispersion exhibiting a single peak, and not that of a multiple dispersion exhibiting a distribution with multiple peaks. From the perspective of the availability of monodisperse particles, nonmagnetic powder in the form of powder of an inorganic substance is desirable. Examples of powders of inorganic substances are various powders of metal oxides, metal carbonates, metal sulfates, metal nitrides, metal carbides, and metal sulfides. Inorganic oxide powders are desirable. The protrusion-forming agent is preferably a colloidal particle, more preferably an inorganic oxide colloidal particle. From the perspective of the availability of monodisperse particles, the inorganic oxide constituting the inorganic oxide colloidal particles is desirably silicon dioxide (silica). The inorganic oxide colloidal particles are preferably colloidal silica (silica colloid particles). In the present invention and specification, the term "colloidal particles" refers to particles that are capable of dispersing to yield a colloidal dispersion without precipitating, when added in a quantity of 1 g per 100 mL to at least one organic solvent in the form of at least methyl ethyl ketone, cyclohexanone, toluene, or ethyl acetate, or a mixed solvent containing two or more of these solvents in any blending ratio. The average particle size of the colloidal particles is a value that is determined by the method set forth as an average particle diameter measurement method in Japanese Unexamined Patent Publication (KOKAI) No. 2011-048878, paragraph 0015. The content of the above publication is expressly incorporated herein by reference in its entirety. In another embodiment, the protrusion-forming agent is desirably carbon black.

The average particle size of the protrusion-forming agent is, for example, 30 nm to 300 nm, desirably 40 nm to 200 nm. The content of protrusion-forming agent in the magnetic layer is desirable 1.0 to 4.0 weight parts, preferably 1.5 to 3.5 weight parts, per 100.0 weight parts of ferromagnetic powder.

As set forth above, additional nonmagnetic powder can be employed in addition to the above-described nonmagnetic powder to control the base portion friction to less than or equal to 0.35. Such nonmagnetic powder desirably has Mohs hardness of less than or equal to 8. Various kinds of nonmagnetic powder that are commonly employed in the nonmagnetic layer can be employed. The details are as set forth further below for the nonmagnetic layer. An example of preferred nonmagnetic powder is colcothar. Colcothar has Mohs hardness of about 6.

In the same manner as for the ferromagnetic powder that is employed along with the ferromagnetic powder employed in the greatest proportion as set forth above, an average particle size that is greater than that of the ferromagnetic powder is desirable in the additional nonmagnetic powder.

That is because it permits a reduction in the base portion friction by means of protrusions formed on the base portion by the additional nonmagnetic powder. From this perspective, the difference between the average particle size of the ferromagnetic powder and the average particle size of the additional nonmagnetic powder employed with it, obtained as "(average particle size of latter)–(average particle size of former)", desirably falls within a range of 10 nm to 80 nm, preferably within a range of 10 nm to 50 nm. When employing two or more kinds of ferromagnetic powder of differing average particle size as the ferromagnetic powder, the ferromagnetic powder that is employed in the greatest proportion is adopted among the two or more kinds of ferromagnetic powder as the ferromagnetic powder that is used to calculate the difference in average particle size with the additional nonmagnetic powder. It is naturally also possible to employ two or more kinds of nonmagnetic powder of differing average particle size as the additional nonmagnetic powder. In that case, it is desirable for the average particle size of at least one of the two or more kinds of nonmagnetic powder to satisfy the above difference, preferable for many of the average particle sizes of the nonmagnetic powders to satisfy this difference, and more preferable for the average particle sizes of all of the additional nonmagnetic powders to satisfy this difference.

From the perspective of controlling the base portion friction, the mixing ratio of the ferromagnetic powder and the above additional nonmagnetic powder (the combined total when employing two or more kinds of additional nonmagnetic powder with differing average particle sizes) based on weight desirably falls within a range of former:latter=90.0:10.0 to 99.9:0.1, preferably within a range of 95.0:5.0 to 99.5:0.5.

<Nonmagnetic Layer>

The nonmagnetic layer will be described next. In the above magnetic tape, a nonmagnetic layer containing nonmagnetic powder and binder is present between the nonmagnetic support and the magnetic layer. The nonmagnetic powder that is employed in the nonmagnetic layer can be an organic or an inorganic substance. Carbon black or the like can also be employed. Examples of inorganic substances are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details. Reference can be made to Japanese Unexamined Patent Publication (KOKAI) No. 2010-24113, paragraphs 0040 and 0041, for details on carbon black that can be used in the nonmagnetic layer. The content of nonmagnetic powder in the nonmagnetic layer desirably falls within a range of 50 to 90 weight percent, preferably within a range of 60 to 90 weight percent.

Known techniques relating to binders, additives and the like of the nonmagnetic layer can be applied to the nonmagnetic layer. In addition, for example, known techniques relating to magnetic layers can be applied as regards the quantity and type of binder and the quantities and types of additives.

The nonmagnetic layer of the above magnetic tape may be in the form of an essentially nonmagnetic layer containing small quantities of ferromagnetic powder, either in the form of impurities or by intention, for example, along with nonmagnetic powder. The term "essentially nonmagnetic layer" refers to a layer with a residual magnetic flux density of less than or equal to 10 mT or a coercive force of less than or equal to 7.96 kA/m (100 Oe), or a layer with a residual magnetic flux density of less than or equal to 10 mT and a coercive force of less than or equal to 7.96 kA/m (100 Oe). The nonmagnetic layer desirably has neither residual magnetic flux density nor coercive force.

<Nonmagnetic Support>

The nonmagnetic support will be described next. Known nonmagnetic supports in the form of biaxially stretched polyethylene terephthalate, polyethylene naphthalate, polyamide, polyamide-imide, aromatic polyamide, and the like are examples. Of these, polyethylene terephthalate, polyethylene naphthalate, and polyamide are desirable. These supports can be subjected in advance to treatments such as corona discharge, plasma treatments, adhesion-enhancing treatments, and heat treatments.

<Various Thicknesses>

The thickness of the nonmagnetic layer in the above magnetic tape is less than or equal to 0.50 μm. The thickness of the nonmagnetic layer is, for example, greater than or equal to 0.10 μm. From the perspective of reducing the thickness of the magnetic tape, the thickness of the nonmagnetic layer is desirably less than or equal to 0.40 μm, preferably less than or equal to 0.30 μm.

The thickness of the nonmagnetic support is desirably 3.00 μm to 4.50 μm.

The thickness of the magnetic layer can be optimized based on the saturation magnetization level and head gap length of the magnetic head employed, and the bandwidth of the recording signal. Generally, it can be from 0.01 μm to 0.15 μm. From the perspective of achieving higher density recording, it is desirably 0.02 μm to 0.12 μm, preferably from 0.03 μm to 0.10 μm. A single magnetic layer is sufficient, and the magnetic layer can be divided into two or more layers having different magnetic characteristics. Known configurations of multilayer magnetic layers can be applied.

From the perspective of reducing the thickness of the magnetic tape, the combined thickness of the magnetic layer and the nonmagnetic layer is desirably less than or equal to 0.60 μm, preferably less than or equal to 0.50 μm. The combined thickness of the magnetic layer and nonmagnetic layer is, for example, greater than or equal to 0.10 μm, and can be greater than or equal to 0.20 μm.

From the perspective of enhancing the recording capacity of a single magnetic tape cartridge, the overall thickness of the magnetic tape is desirably less than or equal to 6.00 μm, preferably less than or equal to 5.70 μm, and more preferably, less than or equal to 5.50 μm. From the perspective of ease of handling (the handling property) of the magnetic tape, the overall thickness of the magnetic tape is desirably greater than or equal to 1.00 μm.

<Backcoat Layer>

In the above magnetic tape, a backcoat layer can be present on the opposite surface of the nonmagnetic support from the surface on which the magnetic layer is present. The backcoat layer is a layer containing nonmagnetic powder and binder, can contain carbon black and/or inorganic powder, and can desirably contain carbon black and inorganic powder. The formulas of the magnetic layer and nonmagnetic layer can be applied to the binder and various additives for forming the backcoat layer. The thickness of the backcoat layer is desirably less than or equal to 0.90 μm, preferably 0.10 μm to 0.70 μm.

The thickness of the various layers in the magnetic tape and the nonmagnetic support can be determined by known film thickness measuring methods. For example, a cross-section in the direction of thickness of the magnetic tape is exposed by a known technique such as with an ion beam or microtome, and the exposed cross-section is observed with a scanning electron microscope. The thickness determined at one spot in the direction of thickness by observing the cross-section can be adopted, or the thickness at two or more spots that have been randomly exposed—for example, two spots—can be determined and the arithmetic average thereof adopted. The thickness of each of the various layers can also be determined as a design thickness calculated from manufacturing conditions.

<Surface Roughness of the Magnetic Layer>

In magnetic tapes for high density recording, such as data backup tapes, it is desirable to enhance the smoothness of the surface of the magnetic layer. By increasing the smoothness of the surface of the magnetic layer, it is possible to reduce the spacing loss. As a result, it becomes possible to achieve good electromagnetic characteristics during the reproduction of a signal recorded at high density. From these perspectives, the above magnetic tape also desirably has a magnetic layer with a highly smooth surface. The centerline average surface roughness Ra as measured by an atomic force microscope (AFM) on the surface of the magnetic layer can be employed as an indicator of the surface smoothness of the magnetic layer. The centerline average surface roughness Ra as measured by an atomic force microscope refers to the centerline average surface roughness Ra measured for an area of 40 µm×40 µm on the surface of the magnetic layer. By way of example, a Nanoscope (Japanese registered trademark) III made by Digital Instruments can be employed in contact mode as the atomic force microscope. From the perspective of reducing the spacing loss, the centerline average surface roughness Ra that is measured by an atomic force microscope on the surface of the magnetic layer of the above magnetic tape is desirably less than or equal to 2.8 nm, preferably less than or equal to 2.5 nm, and more preferably, less than or equal to 2.2 nm. From the perspective of running stability, it is desirably greater than or equal to 0.5 nm, preferably greater than or equal to 1.0 nm, and more preferably, greater than or equal to 1.5 nm.

The smoothness of the surface of the magnetic layer can be enhanced (that is, the Ra can be lowered) by increasing the dispersion of the various powders in the composition for forming the magnetic layer. From this perspective, it is desirable to separately disperse the abrasive along with the ferromagnetic powder, and preferable to separately disperse it with the various powders, including the ferromagnetic powder, in the course of preparing the composition for forming the magnetic layer.

<Manufacturing Process>

The coating compositions (coating liquids) for forming the magnetic layer, nonmagnetic layer, and backcoat layer normally contain solvent in addition to the various components set forth above. The various organic solvents that are commonly employed to manufacture particulate magnetic tapes can be employed as the solvent. The process of preparing the coating composition for forming each layer normally contains at least a kneading step, dispersing step, and mixing steps provided as needed before and after these steps. The various steps can each be divided into two or more steps. All of the starting materials employed in an aspect of the present invention, such as ferromagnetic powder, nonmagnetic powder, abrasive, binder, various abrasives that can be optionally added, and solvent, can be added either initially during the step or part way through. Any individual starting material can be divided for addition in two or more steps. In one embodiment, in preparing the coating composition for forming the magnetic layer, the abrasive is desirably dispersed separately from the ferromagnetic powder. Known manufacturing techniques can be used to manufacture the above magnetic tape. A device with powerful kneading strength such as an open kneader, continuous kneader, pressure kneader, or extruder is desirably employed in the kneading step. Details regarding the kneading processing are described in Japanese Unexamined Patent Publication (KOKAI) Heisei Nos. 1-106338 and 1-79274, which are expressly incorporated herein by reference in their entirety. Further, glass beads and other beads can be employed to disperse the coating compositions for forming the various layers. Dispersion beads with high specific gravities such as zirconia beads, titania beads, and steel beads are suitably employed as such dispersion beads. The particle diameter and fill rate of the dispersion beads can be optimized for use. A known dispersing apparatus can be employed. As set forth above, one means of obtaining a magnetic tape having ΔSFD calculated with Equation 1 that falls within a range of greater than or equal to 0.50 is desirably to intensify the dispersion conditions (lengthen the dispersion period, reduce the diameter and increase the filling of the dispersion beads employed, and the like). Reference can be made, for example, to paragraphs 0051 to 0057 in Japanese Unexamined Patent Publication (KOKAI) No. 2010-24113, which is expressly incorporated herein by reference in its entirety, for details regarding methods of manufacturing magnetic tapes. Reference can be made to paragraph 0052 in Japanese Unexamined Patent Publication (KOKAI) No. 2010-24113, regarding orientation treatment. As set forth above, one means of obtaining a magnetic tape with ΔSFD calculated with Equation 1 that falls within a range of greater than or equal to 0.50 is desirably to conduct vertical orientation. It is also desirable not to conduct orientation treatment (to conduct non-orientation).

In one embodiment, in controlling the base portion friction as set forth above, two or more ferromagnetic powders of differing average particle size can be employed to manufacture the magnetic tape. That is, the magnetic layer can be formed using ferromagnetic powders in the form of a first ferromagnetic powder and one or more ferromagnetic powders of greater average particle size than the first ferromagnetic powder. The following embodiments are examples of forms of desirable methods of forming such a magnetic layer. Two or more of the embodiments given below can be combined as a preferred embodiment of the above manufacturing method. The "first ferromagnetic powder" refers to one of the ferromagnetic powder among the two or more kinds of ferromagnetic powder employed, and desirably refers to the ferromagnetic powder that is employed in the greatest proportion as set forth above. Other details regarding the method of forming the magnetic layer are as set forth above.

The average particle size of the first ferromagnetic powder can fall within a range of 10 nm to 80 nm.

The difference between the average particle size of the ferromagnetic powder with an average particle size greater than that of the first ferromagnetic powder and the average particle size of the first ferromagnetic powder can fall within a range of 10 nm to 50 nm.

The mixing ratio of the first ferromagnetic powder to the ferromagnetic powder with an average particle size greater than that of the first ferromagnetic powder, by weight, can fall within a range of former:latter=90.0:10.0 to 99.9:0.1.

In another embodiment, the magnetic tape can be manufactured using additional nonmagnetic powder in addition to the abrasive and protrusion-forming agent as nonmagnetic powders in the magnetic layer. That is, the magnetic layer can be formed using additional nonmagnetic powder along with the abrasive and protrusion-forming agent as the nonmagnetic powder. The following embodiments are examples of a desirable embodiment of the method of forming such a magnetic layer. A combination of two or more of the following embodiments is a preferred embodiment of the above manufacturing method. Other details regarding the method of forming the magnetic layer are as set forth above.

The average particle size of the additional nonmagnetic powder can be greater than the average particle size of the ferromagnetic powder.

The difference between the average particle size of the ferromagnetic powder and the average particle size of the additional nonmagnetic powder can fall within a range of 10 nm to 80 nm.

The mixing ratio of the ferromagnetic powder and the additional nonmagnetic powder, based on weight, can fall within a range of former:latter=90.0:10.0 to 99.9:0.1.

Magnetic Tape Cartridge and Magnetic Recording and Reproducing Device

A further aspect of the present invention relates to a magnetic tape cartridge housing the above magnetic tape.

A still further aspect of the present invention relates to a magnetic recording and reproducing device containing the above magnetic tape cartridge and magnetic head.

In a magnetic tape cartridge, the magnetic tape is generally housed in a wound-up state on one or two reels within the cartridge main body. The reels are disposed in a manner permitting rotation within the main body of the cartridge. Magnetic tape cartridges in the form of single-reel type magnetic tape cartridges equipped with a single reel within the cartridge main body and dual-reel type magnetic tape cartridges equipped with two reels within the cartridge main body are widely employed. When a single-reel magnetic tape cartridge is loaded into a magnetic recording and reproducing device (drive) to record and/or reproduce a magnetic signal on the magnetic tape, the magnetic tape is drawn out of the magnetic tape cartridge and taken up on a reel on the drive side. A magnetic head is disposed on the tape conveyance route from the magnetic tape cartridge to the take-up reel. Magnetic tape feeding and winding take place between the reel (feed reel) on the magnetic tape cartridge side and the reel (tape-up reel) on the drive side. In this space, the magnetic head and the surface of the magnetic layer of the magnetic tape come into contact (slide against each other) to conduct magnetic signal recording and reproduction. By contrast, in a dual-reel magnetic tape cartridge, the two reels of the feed reel and the take-up reel are provided within the magnetic tape cartridge. The magnetic tape cartridge of an aspect of the present invention can be of either the single-reel type or dual-reel type magnetic tape cartridge. The configuration of the magnetic tape cartridge is known. In the magnetic tape cartridge according to an aspect of the present invention, known configurations can be applied without limitation. For example, the magnetic tape cartridge according to an aspect of the present invention can be a linear-tape-open (LTO) format magnetic tape cartridge. Further, the magnetic tape cartridge according to an aspect of the present invention can be a magnetic tape cartridge of other than LTO format.

The greater the total length of the magnetic tape that is housed in each magnetic tape cartridge, the greater the recording capacity per cartridge can be made. For this reason, the total length of the magnetic tape that is housed in the above magnetic tape cartridge is desirably greater than or equal to 10 m, with from about 10 in to 1,500 m being suitable. However, the greater the total length of the tape, the greater the time required for recording and/or reproduction at a given running speed (also referred to as the "conveyance speed" hereinafter) during the recording and/or reproduction of a magnetic signal on the magnetic tape. Thus, it is desirable to increase the conveyance speed to shorten the recording and reproduction time when the overall length of the tape is increased to enhance the recording capacity. Increasing the conveyance speed regardless of the total length of the tape is desirable to shorten the recording and reproduction time. In the magnetic tapes in which the thickness of the nonmagnetic layer is thin, less than or equal to 0.50 μm, the phenomenon of a drop in abrasiveness appeared with repeated running at low temperature and low humidity. This phenomenon tends to become more pronounced as the conveyance speed rises (high-speed conveyance is conducted). By contrast, although the thickness of the nonmagnetic layer is less than or equal to 0.50 μm in the magnetic tape according to an aspect of the present invention, since the base portion friction and ΔSFD calculated with Equation 1 are kept within the ranges set forth above, it becomes possible to inhibit the drop in abrasiveness even with repeated high-speed conveyance at low temperature and low humidity. Accordingly, the magnetic tape according to an aspect of the present invention is suitable as a magnetic tape in magnetic tape cartridges in which the overall length of the tape is increased to enhance the recording capacity, magnetic recording and reproducing devices in which the conveyance speed has been increased to shorten the recording and reproduction time, and the like. The term "high-speed conveyance" means, for example, a conveyance speed of greater than or equal to 7 m/sec or greater than or equal to 8 m/sec as the speed of the magnetic head relative to the magnetic tape during the recording and reproduction of a magnetic signal. In high-speed conveyance, the conveyance speed can be, for example, about 8 m/sec to 15 m/sec.

A magnetic head such as a magnetoresistive (MR) magnetic head and a magnetic head known as a reproduction head can be employed as the magnetic heads in the magnetic recording and reproducing device according to an aspect of the present invention. The configuration of magnetic recording and reproducing devices is known. A known configuration can be applied without limitation to the configuration of the magnetic recording and reproducing device according to an aspect of the present invention.

EXAMPLES

The present invention will be described in greater detail below through Examples. However, the present invention is not limited to the embodiments shown in Examples. The "parts" and "percent (%)" indicated below denote "weight parts" and "weight percent (%)", unless otherwise stated.

Example 1

1. Preparing an Alumina Dispersion

To 100.0 parts of alumina powder (HIT-70 made by Sumitomo Chemical) with an alpha-conversion rate of about 65% and a BET surface area of 30 $m^2/g$ were added 3.0 parts of 2,3-dihydroxynaphthalene (made by Tokyo Chemical), 31.3 parts of a 32% solution (with the solvent being in the form of a mixed solvent of methyl ethyl ketone and toluene) of polyester polyurethane resin (UR-4800 (quantity of polar groups: 80 meq/kg) made by Toyobo (Japanese registered trademark)) having polar groups in the form of $SO_3Na$ groups, and 570.0 parts of a 1:1 (by weight) mixed solution of methyl ethyl ketone and cyclohexanone were admixed and the mixture was dispersed for 5 hours in a paint shaker in the presence of zirconia beads. Following dispersion, the dispersion and the beads were separated by means of a mesh, yielding an alumina dispersion.

2. Formula of Magnetic Layer-Forming Composition

| (Magnetic liquid) | |
|---|---|
| Ferromagnetic powder (1) (see Table 1) | See Table 1 |
| Ferromagnetic powder (2) (see Table 1) | See Table 1 |
| SO$_3$Na group-containing polyurethane resin (weight average molecular weight: 70,000, SO$_3$Na groups: 0.2 meq/g) | 14.0 parts |
| Cyclohexanone | 150.0 parts |
| Methyl ethyl ketone | 150.0 parts |
| (Abrasive liquid) | |
| The alumina dispersion prepared in 1. above | 6.0 parts |
| (Silica sol) | |
| Colloidal silica (average particle size: 100 nm) | 2.0 parts |
| Methyl ethyl ketone | 1.4 parts |
| (Other components) | |
| Stearic acid | 2.0 parts |
| Butyl stearate | 6.0 parts |
| Polyisocyanate (Coronate (Japanese registered trademark) made by Nippon Polyurethane Industry, Co.) | 2.5 parts |
| (Solvents added to finish) | |
| Cyclohexanone | 200.0 parts |
| Methyl ethyl ketone | 200.0 parts |

3. Formula of Nonmagnetic Layer-Forming Composition

| Nonmagnetic inorganic powder: α-iron oxide Average particle size (average major axis length): 10 nm Average acicular ratio: 1.9 BET specific surface area: 75 m$^2$/g | 100.0 parts |
|---|---|
| Carbon black Average particle size: 20 nm | 20.0 parts |
| SO$_3$Na group-containing polyurethane resin (Weight average molecular weight: 70,000, SO$_3$Na groups: 0.2 meq/g) | 18.0 parts |
| Stearic acid | 1.0 part |
| Cyclohexanone | 300.0 parts |
| Methyl ethyl ketone | 300.0 parts |

4. Formula of Backcoat Layer-Forming Composition

| Nonmagnetic inorganic powder: α-iron oxide Average particle size (average major axis length): 0.15 μm Average acicular ratio: 7 BET specific surface area: 52 m$^2$/g | 80.0 parts |
|---|---|
| Carbon black Average particle size: 20 nm | 20.0 parts |
| Vinyl chloride copolymer | 13.0 parts |
| Sulfonic acid salt group-containing polyurethane resin | 6.0 parts |
| Phenylphosphonic acid | 3.0 parts |
| Cyclohexanone | 155.0 parts |
| Methyl ethyl ketone | 155.0 parts |
| Stearic acid | 3.0 parts |
| Butyl stearate | 3.0 parts |
| Polyisocyanate | 5.0 parts |
| Cyclohexanone | 200.0 parts |

5. Preparation of Compositions for Forming Various Layers

A magnetic layer-forming composition was prepared by the following method. The above magnetic liquid was prepared by dispersing (bead dispersion) for the time indicated in Table 1 the various components in a batch-type vertical sand mill. Zirconia beads with a bead diameter of 0.5 mmΦ were employed as the dispersion beads. Using this sand mill, the magnetic liquid that bad been prepared and the above abrasive liquid were mixed with the other components (silica sol, other components, and solvents added to finish) and bead dispersed for 5 minutes, followed by treatment for 0.5 minute (ultrasonic dispersion) with a batch-type ultrasonic device (20 kHz, 300 W). Subsequently, filtering was conducted with a filter having an average pore diameter of 0.5 μm to prepare a magnetic layer-forming composition. A portion of the magnetic layer-forming composition that had been prepared was collected and the dispersion particle diameter, an indicator of dispersion of the ferromagnetic powder, was measured. The measurement values are given in Table 1.

A nonmagnetic layer-forming composition was prepared by the following method. The various components excluding the stearic acid, cyclohexane, and methyl ethyl ketone were dispersed for 24 hours in a batch-type vertical sand mill, yielding a dispersion. Zirconia beads with a bead diameter of 0.1 mmΦ were employed as the dispersion beads. Subsequently, the remaining components were added to the dispersion obtained and the mixture was stirred in a dissolver. The dispersion thus obtained was filtered with a filter having an average pore diameter of 0.5 μm to prepare a nonmagnetic layer-forming composition.

A backcoat layer-forming composition was prepared by the following method. The various components excluding the lubricants (stearic acid and butyl stearate), polyisocyanate, and cyclohexanone were kneaded and diluted in an open kneader. The mixture was then subjected to 12 passes of dispersion processing, each pass containing a residence time of 2 minutes, at a bead fill rate of 80 volume % and a rotor tip peripheral speed of 10 m/sec using 1 mm zirconia beads in a horizontal bead mill disperser. Subsequently, the remaining components were added to the dispersion obtained and the mixture was stirred in a dissolver. The dispersion thus obtained was filtered using a filter having an average pore diameter of 1 μm to prepare a backcoat layer-forming composition.

6. Fabrication of a Magnetic Tape

The nonmagnetic layer-forming composition prepared in 5. above was coated and dried to the dry thickness indicated in Table 1 on the surface of a polyethylene naphthalate support of the thickness indicated in Table 1, after which the magnetic layer-forming composition prepared in 5. above was coated to the dry thickness indicated in Table 1 and dried without conducting orientation. Subsequently, the backcoat layer-forming composition prepared in 5. above was coated and dried to the dry thickness indicated in Table 1 on the opposite surface of the polyethylene naphthalate support from that on which the nonmagnetic layer and magnetic layer had been formed.

Subsequently, a surface-smoothing treatment (calendering treatment) was conducted at a rate of 100 m/minute, a linear pressure of 300 kg/cm, and a calender temperature (calender roll surface temperature) of 100° C. with calender rolls comprised solely of metal rolls. Subsequently, a heat treatment was conducted for 36 hours in an environment with a temperature of 70° C. Following the heat treatment, the product was slit to a width of ½ inch (0.0127 meter), yielding a magnetic tape.

Examples 2 to 7, Comparative Examples 1 to 10

Table 1 gives the ferromagnetic powders, the bead dispersion times during preparation of the magnetic layer-forming composition, whether or not orientation processing was conducted, and the thickness of the various layers and of the nonmagnetic support used to prepare the magnetic tapes of Examples 2 to 7 and Comparative Examples 1 to 10. With the exception of what is shown in Table 1 and the fact that kneading and dilution of the various components of the magnetic liquid were conducted in an open kneader prior to bead dispersion in cases when ferromagnetic metal powder was employed, the magnetic tapes of the various examples and comparative examples were fabricated by the same method as in Example 1.

In Table 1, cases where ferromagnetic hexagonal barium ferrite powder was employed as the ferromagnetic powder are denoted by BF and cases where ferromagnetic metal powder was employed are denoted by MP. The formula ratios given in Table 1 are the contents based on weight of the various ferromagnetic powders per 100.0 weight parts of the total quantity of ferromagnetic powder. In Table 1, the average particle size of the ferromagnetic powder is the average plate diameter for ferromagnetic hexagonal barium ferrite powder and the average major axis length for ferromagnetic metal powder. The average particle size of ferromagnetic powder is a value obtained by measuring the average particle size by collecting a required quantity from the ferromagnetic powder lot employed to fabricate the magnetic tape and applying the method set forth above. Following measurement, the ferromagnetic powder was used to prepare the magnetic liquid for fabricating the magnetic tape.

In cases where "None" is recorded in the orientation column, no orientation processing was conducted. In cases where "Vertical" is recorded, a magnetic field with a magnetic field strength of 0.3 T was applied vertically to the surface of the coated magnetic layer-forming composition while it was still wet in a vertical orientation treatment, after which drying was conducted.

The thickness of the various layers and the nonmagnetic supports of the magnetic tapes fabricated, as well as the overall thickness, were determined by the following method. The fact that the thickness of the various layers formed and of the nonmagnetic support were as stated in Table 1 was confirmed.

A cross-section of the magnetic tape in the direction of thickness was exposed with an ion beam, after which the exposed cross-section was observed by a scanning electron microscope. The various thicknesses were determined as the arithmetic average of thicknesses obtained at two spots in the direction of thickness when observing the cross-section.

7. Evaluation Methods
(1) Measurement of Dispersion Particle Diameter in Magnetic Layer-Forming Composition A portion of the magnetic layer-forming composition prepared in 5. above was collected and a sample solution diluted to 1/50 by weight with the organic solvent used to prepare the composition was prepared. For the sample solution prepared, the arithmetic average particle diameter measured with a light-scattering particle size distribution meter (LB500 made by Horiba) was adopted as the dispersion particle diameter.

(2) Measurement of the Average Particle Size of the Ferromagnetic Powder

The average particle size of the ferromagnetic powder was determined by the method set forth above.

(3) Measuring the Ferromagnetic Powder $\Delta SFD_{powder}$ and the Coercivity Hc A vibrating sample magnetometer (made by Toei-Kogyo Co., Ltd.) was employed to measure the SFD and the coercive force Hc at an applied magnetic field of 796 kA/m (10 kOe) in an environment with temperatures of 100° C. and 25° C. in the ferromagnetic powders. $\Delta SFD_{powder}$ ($\Delta SFD$ (100° C.)−(25° C.) in Table 1) was calculated using Equation 2 from the SFD measurement results.

(4) Base Portion Friction

Scribe marks were made in advance with a laser marker on the measurement surface and an atomic force microscope (AFM) image was measured in a portion at a certain distance (about 100 µm) from them. This was done at a viewing area 7 µm square. As set forth further below, to facilitate the pickup up of a scanning electron microscope (SEM) image at the spot, a hard (single crystal silicon) cantilever was installed and scribe marks were made on the AFM. All protrusions with a height of greater than or equal to 15 nm above the reference plane were extracted from the AFM image thus measured. The spot where no protrusions were found was specified as the base portion. The base portion friction was measured by the method described above using a TI-950 Triboindenter made by Hysitron Corp.

A SEM image was measured at the same spot where the AFM had been measured and a component map was obtained. The protrusions greater than or equal to 15 nm in height above the reference plane that were extracted were determined to be protrusions formed of alumina or colloidal silica. In Examples 1 to 7, in the component map by SEM, alumina and colloidal silica were not confirmed on the base portion. Component analysis was performed there by SEM. However, component analysis is not limited to SEM, and can be conducted by known methods such as energy dispersive X-ray spectrometry (EDS), auger electron spectroscopy (AES), or the like.

(5) Measurement of $\Delta SFD$ in the Longitudinal Direction of the Magnetic Tape A vibrating sample magnetometer (made by Toei-Kogyo Co., Ltd.) was employed to measure the SFD in the longitudinal direction of the magnetic tape at an applied magnetic field of 796 kA/m (10 kOe) in environments with temperatures of 25° C. and −190° C. The $\Delta SFD$ in the longitudinal direction of the magnetic tape ($\Delta SFD$ (25° C.)−(−190° C.) in Table 1) was calculated using Equation 1 from the SFD measurement results.

(6) Centerline Average Surface Roughness Ra of the Surface of the Magnetic Layer An atomic force microscope in the form of a Nanoscope III made by Digital Instruments was employed in contact mode to measure the centerline average surface roughness Ra of the surface of the magnetic layer by the method set forth above. Based on measurement, the centerline average surface roughness Ra of the surface of the magnetic layer of the magnetic tapes of Examples was determined to fall within a range of 2.0 nm to 2.2 nm.

(7) Change in Abrasiveness of Magnetic Layer Before and after Repeated Running at Low Temperature and Low Humidity (Abrasiveness Test)

Magnetic tapes for measuring the width of abrasiveness A below and the width of abrasiveness B below were prepared for the various examples and comparative examples.

In an environment in which the temperature was controlled to 13° C.±1° C. and the relative humidity to 15%, the surface of the magnetic layer of each of the magnetic tapes of the examples and the comparative examples was brought into contact at a lapping angle of 12 degrees with one edge of an AlFeSil square rod so as to be perpendicular to the longitudinal direction of the AlFeSil square rod (square rod specified by ECMA (European Computer Manufacturers Association) 288/Annex H/H2). In that state, a magnetic tape 20 m in total length was run back and forth 50 times at a speed of 3 m/sec under a tension of 1.0 N. The term "AlFeSil square rod" refers to a square rod made of AlFeSil, an alloy of Sendust.

The edge of the square rod was observed from above with an optical microscope and the scope of abrasiveness (width of abrasiveness of AlFeSil) was determined based on the description given in Japanese Unexamined Patent Publication (KOKAI) No. 2007-026564, paragraph 0015, and FIG. 1 of the same. The content of the above publication is expressly incorporated herein by reference in its entirety.

The width of abrasiveness obtained for a magnetic tape prior to running was denoted as width of abrasiveness A, and the width of abrasiveness determined for the magnetic tape following repeated running was denoted as scope of abrasiveness B. The difference in the width of abrasiveness before running and following repeated running was calculated as follows.

(Change in width of abrasiveness)=A−B

Table 1 gives the calculation results. When the change in the width of abrasiveness thus determined was less than or equal to 5 μm, the abrasiveness of the surface of the magnetic layer was determined to have been maintained even after repeated running at low temperature and low humidity.

(Repeat Running Conditions)

The magnetic tapes of the various examples and comparative examples were repeatedly run while contacting the surface of the magnetic layer with (sliding over it) a magnetic head in a tape running system under the conditions set forth below in an environment in which the temperature was controlled to 13° C. 1° C. and the relative humidity was controlled to 15%.

In a tape running system in which was mounted a magnetic head removed from a Linear Tape Open-Generation 6 (LTO-G6) drive made by IBM, a magnetic tape 20 m in total length was repeatedly fed out and taken up between the feed roll and take-up roll of the tape running system, and subjected to 10,000 run cycles at a conveyance speed of 12 m/sec under a tension of 0.6 N.

The results of the above are given in Table 1.

TABLE 1

| | | Ex. 1 | Ex. 2 | Ex. 3 | Ex. 4 | Ex. 5 | Ex. 6 | Ex. 7 |
|---|---|---|---|---|---|---|---|---|
| Ferromagnetic powder(1) | Type | BF | MP | BF | BF | BF | BF | BF |
| | Average particle size | 20 nm | 38 nm | 20 nm | 27 nm | 35 nm | 27 nm | 27 nm |
| | $\Delta$ SFD (100° C.)-(25° C.) | 0.80 | 0.10 | 0.80 | 0.30 | 0.80 | 0.30 | 0.30 |
| | Hc/kA/m | 203 | 224 | 203 | 188 | 220 | 188 | 188 |
| | Formula ratio | 99.0% | 99.0% | 98.5% | 99.0% | 99.2% | 98.5% | 98.5% |
| Ferromagnetic powder(2) | Type | BF | MP | BF | BF | BF | BF | BF |
| | Average particle size | 55 nm | 60 nm | 55 nm | 55 nm | 55 nm | 55 nm | 55 nm |
| | $\Delta$ SFD (100° C.)-(25° C.) | 0.15 | 0.15 | 0.15 | 0.15 | 0.15 | 0.15 | 0.15 |
| | Hc/kA/m | 358 | 371 | 358 | 358 | 358 | 358 | 358 |
| | Formula ratio | 1.0% | 1.0% | 1.5% | 1.0% | 0.8% | 1.5% | 1.5% |
| Dispersion particle diameter/nm | | 20 | 50 | 20 | 50 | 20 | 50 | 50 |
| Bead dispersion time/h | | 48 | 35 | 48 | 35 | 48 | 35 | 35 |
| Orientation | | None | Vertical | None | Vertical | None | Vertical | Vertical |
| Longitudinal $\Delta$ SFD (25° C.)-(−190° C.) | | 0.52 | 0.55 | 0.56 | 1.42 | 0.61 | 1.42 | 1.42 |
| Magnetic layer thickness | | 0.10 μm | 0.10 μm | 0.10 μm | 0.10 μm | 0.10 μm | 0.10 μm | 0.10 μm |
| Nonmagnetic layer thickness | | 0.50 μm | 0.50 μm | 0.50 μm | 0.50 μm | 0.50 μm | 0.50 μm | 0.30 μm |
| Magnetic layer thickness + Nonmagnetic layer thickness | | 0.60 μm | 0.60 μm | 0.60 μm | 0.60 μm | 0.60 μm | 0.60 μm | 0.40 μm |
| Nonmagnetic support thickness | | 4.30 μm | 4.30 μm | 4.30 μm | 4.30 μm | 4.30 μm | 4.30 μm | 4.30 μm |
| Backcoat layer thickness | | 0.60 μm | 0.60 μm | 0.60 μm | 0.60 μm | 0.60 μm | 0.60 μm | 0.60 μm |
| Total thickness of the magnetic tape | | 5.50 μm | 5.50 μm | 5.50 μm | 5.50 μm | 5.50 μm | 5.50 μm | 5.30 μm |
| Base portion friction | | 0.27 | 0.26 | 0.23 | 0.27 | 0.35 | 0.23 | 0.23 |
| Change in width of abrasiveness | | 4 μm | 5 μm | 4 μm | 4 μm | 5 μm | 2 μm | 3 μm |

| | | Comp. Ex. 1 | Comp. Ex. 2 | Comp. Ex. 3 | Comp. Ex. 4 | Comp. Ex. 5 |
|---|---|---|---|---|---|---|
| Ferromagnetic powder(1) | Type | BF | BF | BF | BF | BF |
| | Average particle size | 22 nm | 22 nm | 22 nm | 22 nm | 22 nm |
| | $\Delta$ SFD (100° C.)-(25° C.) | 0.10 | 0.10 | 0.10 | 0.10 | 0.10 |
| | Hc/kA/m | 203 | 203 | 203 | 203 | 203 |
| | Formula ratio | 100.0% | 100.0% | 100.0% | 100.0% | 100.0% |
| Ferromagnetic powder(2) | Type | — | — | — | — | — |
| | Average particle size | — | — | — | — | — |
| | $\Delta$ SFD (100° C.)-(25° C.) | — | — | — | — | — |
| | Hc/kA/m | | | | | |
| | Formula ratio | — | — | — | — | — |
| Dispersion particle diameter/nm | | 80 | 80 | 80 | 80 | 80 |
| Bead dispersion time/h | | 24 | 24 | 24 | 24 | 24 |
| Orientation | | None | None | None | None | None |
| Longitudinal $\Delta$ SFD (25° C.)-(−190° C.) | | 0.38 | 0.38 | 0.38 | 0.38 | 0.38 |
| Magnetic layer thickness | | 0.10 μm | 0.10 μm | 0.10 μm | 0.10 μm | 0.10 μm |
| Nonmagnetic layer thickness | | 1.00 μm | 1.00 μm | 0.70 μm | 0.50 μm | 0.30 μm |
| Magnetic layer thickness + Nonmagnetic layer thickness | | 1.10 μm | 1.10 μm | 0.80 μm | 0.60 μm | 0.40 μm |
| Nonmagnetic support thickness | | 4.30 μm | 4.00 μm | 4.30 μm | 4.30 μm | 4.30 μm |
| Backcoat layer thickness | | 0.60 μm | 0.40 μm | 0.30 μm | 0.60 μm | 0.60 μm |
| Total thickness of the magnetic tape | | 6.00 μm | 5.50 μm | 5.40 μm | 5.50 μm | 5.30 μm |
| Base portion friction | | 0.42 | 0.42 | 0.42 | 0.42 | 0.42 |
| Change in width of abrasiveness | | 4 μm | 4 μm | 4 μm | 10 μm | 11 μm |

TABLE 1-continued

|  |  | Comp. Ex. 6 | Comp. Ex. 7 | Comp. Ex. 8 | Comp. Ex. 9 | Comp. Ex. 10 |
|---|---|---|---|---|---|---|
| Ferromagnetic powder(1) | Type | BF | MP | BF | BF | BF |
|  | Average particle size | 22 nm | 38 nm | 22 nm | 20 nm | 27 nm |
|  | ⊿ SFD (100° C.)-(25° C.) | 0.10 | 0.10 | 0.10 | 0.80 | 0.30 |
|  | Hc/kA/m | 203 | 224 | 203 | 203 | 188 |
|  | Formula ratio | 99.0% | 100.0% | 98.5% | 100.0% | 100.0% |
| Ferromagnetic powder(2) | Type | BF | — | BF | — | — |
|  | Average particle size | 55 nm | — | 55 nm | — | — |
|  | ⊿ SFD (100° C.)-(25° C.) | 0.15 | — | 0.15 | — | — |
|  | Hc/kA/m | 358 | — | 358 | — | — |
|  | Formula ratio | 1.0% | — | 1.5% | — | — |
| Dispersion particle diameter/nm |  | 80 | 50 | 80 | 20 | 50 |
| Bead dispersion time/h |  | 24 | 35 | 24 | 48 | 35 |
| Orientation |  | None | Vertical | None | None | Vertical |
| Longitudinal ⊿ SFD (25° C.)-(−190° C.) |  | 0.41 | 0.55 | 0.42 | 0.52 | 1.43 |
| Magnetic layer thickness |  | 0.10 μm | 0.10 μm | 0.10 μm | 0.10 μm | 0.10 μm |
| Nonmagnetic layer thickness |  | 0.50 μm | 0.50 μm | 0.50 μm | 0.50 μm | 0.50 μm |
| Magnetic layer thickness + Nonmagnetic layer thickness |  | 0.60 μm | 0.60 μm | 0.60 μm | 0.60 μm | 0.60 μm |
| Nonmagnetic support thickness |  | 4.30 μm | 4.30 μm | 4.30 μm | 4.30 μm | 4.30 μm |
| Backcoat layer thickness |  | 0.60 μm | 0.60 μm | 0.60 μm | 0.60 μm | 0.60 μm |
| Total thickness of the magnetic tape |  | 5.50 μm | 5.50 μm | 5.50 μm | 5.50 μm | 5.50 μm |
| Base portion friction |  | 0.28 | 0.48 | 0.23 | 0.45 | 0.46 |
| Change in width of abrasiveness |  | 10 μm | 13 μm | 10 μm | 10 μm | 10 μm |

The following determinations were made based on the results given in Table 1:

(1) In the magnetic tapes of Comparative Examples 1 to 3 in which the thickness of the nonmagnetic layer exceeded 0.50 μm, even when the base portion friction exceeded 0.35 and the ΔSFD calculated with Equation 1 was less than 0.50, the decrease in abrasiveness of the magnetic layer due to repeated running under low temperature and low humidity was little. That is, in magnetic tapes in which the thickness of the nonmagnetic layer exceeded 0.50 no relation was found between the base portion friction and the drop in abrasiveness of the magnetic layer due to repeated running at low temperature and low humidity and the ΔSFD calculated with Equation 1.

(2) In contrast, compared to Examples 1 to 7 and Comparative Examples 4 to 10, magnetic tapes in which the thickness of the nonmagnetic layer was less than or equal to 0.50 μm were determined to have maintained the abrasiveness of the magnetic layer even with repeated running at low temperature and low humidity by having a base portion friction of less than or equal to 0.35 and an ΔSFD as calculated with Equation 1 of greater than or equal to 0.50.

An aspect of the present invention is useful in the technical field of magnetic tapes such as backup tapes.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic tape,
which comprises a nonmagnetic layer comprising nonmagnetic powder and binder on a nonmagnetic support, and a magnetic layer comprising ferromagnetic powder, abrasive, and binder on the nonmagnetic layer, wherein:
the thickness of the nonmagnetic layer is less than or equal to 0.50 μm;
the coefficient of friction as measured on a base portion of a surface of the magnetic layer is less than or equal to 0.35;
ΔSFD in a longitudinal direction of the magnetic tape as calculated with Equation 1 is greater than or equal to 0.50:

$$\Delta SFD = SFD_{25° C.} - SFD_{-190° C.} \quad \text{Equation 1}$$

wherein, in Equation 1, $SFD_{25° C.}$ denotes the switching field distribution SFD as measured in the longitudinal direction of the magnetic tape in an environment with a temperature of 25° C., and $SFD_{-190° C.}$ denotes the switching field distribution SFD as measured in the longitudinal direction of the magnetic tape in an environment with a temperature of −190° C.; and the base portion of the surface of the magnetic layer is defined as follows:
defining a plane where volumes of protruding components and volumes of indenting components equal out in a field of view as measured by an atomic force microscope as a reference plane, and defining protrusions as protrusions greater than or equal to 15 nm in height from the reference plane, the base portion is defined as the portion where the number of protrusions greater than or equal to 15 nm in height from the reference plane is zero.

2. The magnetic tape according to claim 1, wherein the abrasive comprises alumina.

3. The magnetic tape according to claim 1, wherein the coefficient of friction as measured on the base portion of the surface of the magnetic layer is greater than or equal to 0.10 but less than or equal to 0.35.

4. The magnetic tape according to claim 1, wherein the ΔSFD is greater than or equal to 0.50 but less than or equal to 1.50.

5. The magnetic tape according to claim 1, wherein the combined thickness of the magnetic layer and nonmagnetic layer is less than or equal to 0.60 μm.

6. The magnetic tape according to claim 1, which comprises a backcoat layer comprising nonmagnetic powder and binder on an opposite side of the nonmagnetic support from a side on which the nonmagnetic layer and magnetic layer are present.

7. The magnetic tape according to claim 1, wherein the total thickness of the magnetic tape is less than or equal to 6.00 μm.

8. The magnetic tape according to claim 1, wherein the ferromagnetic powder is selected from the group consisting of ferromagnetic hexagonal ferrite powder and ferromagnetic metal powder.

9. A magnetic tape cartridge, which houses a magnetic tape, which comprises a nonmagnetic layer comprising nonmagnetic powder and binder on a nonmagnetic support, and a magnetic layer comprising ferromagnetic powder, abrasive, and binder on the nonmagnetic layer, wherein:

the thickness of the nonmagnetic layer is less than or equal to 0.50 μm;

the coefficient of friction as measured on a base portion of a surface of the magnetic layer is less than or equal to 0.35;

ΔSFD in a longitudinal direction of the magnetic tape as calculated with Equation 1 is greater than or equal to 0.50:

$$\Delta SFD = SFD_{25° C.} - SFD_{-190° C.} \qquad \text{Equation 1}$$

wherein, in Equation 1, $SFD_{25° C.}$ denotes the switching field distribution SFD as measured in the longitudinal direction of the magnetic tape in an environment with a temperature of 25° C., and $SFD_{-190° C.}$ denotes the switching field distribution SFD as measured in the longitudinal direction of the magnetic tape in an environment with a temperature of −190° C.; and the base portion of the surface of the magnetic layer is defined as follows:

defining a plane where volumes of protruding components and volumes of indenting components equal out in a field of view as measured by an atomic force microscope as a reference plane, and defining protrusions as protrusions greater than or equal to 15 nm in height from the reference plane, the base portion is defined as the portion where the number of protrusions greater than or equal to 15 nm in height from the reference plane is zero.

10. The magnetic tape cartridge according to claim 9, wherein the total length of the magnetic tape that is housed in the magnetic tape cartridge is greater than or equal to 10 m.

11. The magnetic tape cartridge according to claim 9, wherein the abrasive comprises alumina.

12. The magnetic tape cartridge according to claim 9, wherein the coefficient of friction as measured on the base portion of the surface of the magnetic layer is greater than or equal to 0.10 but less than or equal to 0.35.

13. The magnetic tape cartridge according to claim 9, wherein the ΔSFD is greater than or equal to 0.50 but less than or equal to 1.50.

14. The magnetic tape cartridge according to claim 9, wherein the combined thickness of the magnetic layer and nonmagnetic layer is less than or equal to 0.60 μm.

15. The magnetic tape cartridge according to claim 9, wherein the magnetic tape comprises a backcoat layer comprising nonmagnetic powder and binder on an opposite side of the nonmagnetic support from a side on which the nonmagnetic layer and magnetic layer are present.

16. The magnetic tape cartridge according to claim 9, wherein the total thickness of the magnetic tape is less than or equal to 6.00 μm.

17. The magnetic tape cartridge according to claim 9, wherein the ferromagnetic powder is selected from the group consisting of ferromagnetic hexagonal ferrite powder and ferromagnetic metal powder.

18. A magnetic recording and reproducing device, which comprises a magnetic tape cartridge and a magnetic head, wherein the tape cartridge houses a magnetic tape, which comprises a nonmagnetic layer comprising nonmagnetic powder and binder on a nonmagnetic support, and a magnetic layer comprising ferromagnetic powder, abrasive, and binder on the nonmagnetic layer, wherein:

the thickness of the nonmagnetic layer is less than or equal to 0.50 μm;

the coefficient of friction as measured on a base portion of a surface of the magnetic layer is less than or equal to 0.35;

ΔSFD in a longitudinal direction of the magnetic tape as calculated with Equation 1 is greater than or equal to 0.50:

$$\Delta SFD = SFD_{25° C.} - SFD_{-190° C.} \qquad \text{Equation 1}$$

wherein, in Equation 1, $SFD_{25° C.}$ denotes the switching field distribution SFD as measured in the longitudinal direction of the magnetic tape in an environment with a temperature of 25° C., and $SFD_{-190° C.}$ denotes the switching field distribution SFD as measured in the longitudinal direction of the magnetic tape in an environment with a temperature of −190° C.; and the base portion of the surface of the magnetic layer is defined as follows:

defining a plane where volumes of protruding components and volumes of indenting components equal out in a field of view as measured by an atomic force microscope as a reference plane, and defining protrusions as protrusions greater than or equal to 15 nm in height from the reference plane, the base portion is defined as the portion where the number of protrusions greater than or equal to 15 nm in height from the reference plane is zero.

* * * * *